United States Patent
Foret

(10) Patent No.: US 10,244,614 B2
(45) Date of Patent: Mar. 26, 2019

(54) SYSTEM, METHOD AND APPARATUS FOR PLASMA ARC WELDING CERAMICS AND SAPPHIRE

(71) Applicant: Foret Plasma Labs, LLC, The Woodlands, TX (US)

(72) Inventor: Todd Foret, The Woodlands, TX (US)

(73) Assignee: FORET PLASMA LABS, LLC, The Woodlands, TX (US)

( * ) Notice: Subject to any disclaimer, the term of this patent is extended or adjusted under 35 U.S.C. 154(b) by 347 days.

(21) Appl. No.: 15/094,133

(22) Filed: Apr. 8, 2016

(65) Prior Publication Data

US 2016/0280608 A1    Sep. 29, 2016

Related U.S. Application Data

(63) Continuation-in-part of application No. 14/560,808, filed on Dec. 4, 2014, which is a continuation of
(Continued)

(51) Int. Cl.
*H05H 1/34* (2006.01)
*H05H 1/42* (2006.01)
(Continued)

(52) U.S. Cl.
CPC ............... *H05H 1/42* (2013.01); *C04B 35/10* (2013.01); *C04B 37/001* (2013.01); *F27B 3/085* (2013.01);
(Continued)

(58) Field of Classification Search
CPC . C04B 35/10; C04B 37/001; C04B 2235/322; C04B 2237/343;
(Continued)

(56) References Cited

U.S. PATENT DOCUMENTS 481,979 A    9/1892 Stanley
501,732 A    7/1893 Roeske
(Continued)

FOREIGN PATENT DOCUMENTS

CN    101905196 A    12/2010
CN    202224255 U    5/2012
(Continued)

OTHER PUBLICATIONS

Belani, A., "It's Time for an Industry Initiative on Heavy Oil," JPT Online accessed on Oct. 16, 2007, at http://www.spe.org/spe-app/spe/jpt/2006/06/mangement_heavy_oil.htm.
(Continued)

*Primary Examiner* — Craig Kim
(74) *Attorney, Agent, or Firm* — Daniel J. Chalker; Edwin S. Flores; Chalker Flores, LLP

(57) ABSTRACT

Two ceramic or sapphire pieces are welded together using a plasma torch that includes a cylindrical vessel having first and second ends, a tangential inlet connected to or proximate to the first end, a tangential outlet connected to or proximate to the second end, an electrode housing connected to the first end of the cylindrical vessel such that a first electrode is aligned with a longitudinal axis of the cylindrical vessel, and extends into the cylindrical vessel. A hollow electrode nozzle is connected to the second end of the cylindrical vessel such that the center line of the hollow electrode nozzle is aligned with the longitudinal axis of the cylindrical vessel. A second electrode is positioned proximate to the hollow electrode nozzle. The two ceramic or sapphire pieces are placed between the second electrode and the hollow electrode, and are welded together with the plasma exiting from the hollow electrode.

22 Claims, 26 Drawing Sheets

Related U.S. Application Data application No. 13/282,455, filed on Oct. 26, 2011, now Pat. No. 8,904,749, which is a continuation-in-part of application No. 12/370,591, filed on Feb. 12, 2009, now Pat. No. 8,074,439.

(60) Provisional application No. 61/027,879, filed on Feb. 12, 2008, provisional application No. 62/144,701, filed on Apr. 8, 2015.

(51) Int. Cl.
| | |
|---|---|
| *C04B 37/00* | (2006.01) |
| *C04B 35/10* | (2006.01) |
| *F27B 3/08* | (2006.01) |
| *H05B 6/10* | (2006.01) |
| *H05H 1/24* | (2006.01) |
| *H05H 1/46* | (2006.01) |

(52) U.S. Cl.
CPC ............... *H05B 6/10* (2013.01); *H05H 1/34* (2013.01); *C04B 2235/322* (2013.01); *C04B 2237/343* (2013.01); *C04B 2237/72* (2013.01); *F05D 2230/232* (2013.01); *H05H 2001/245* (2013.01); *H05H 2001/466* (2013.01)

(58) Field of Classification Search
CPC ....... C04B 2237/72; F27B 3/085; H05B 6/10; H05H 1/34; H05H 1/42; H05H 2001/245; H05H 2001/466; F05D 2230/232
See application file for complete search history.

(56) References Cited

U.S. PATENT DOCUMENTS

| | | |
|---|---|---|
| 2,784,294 A | 3/1957 | Gravert |
| 2,898,441 A | 8/1959 | Reed et al. |
| 2,923,809 A | 2/1960 | Clews et al. |
| 3,004,189 A | 10/1961 | Giannini |
| 3,082,314 A | 3/1963 | Arata et al. |
| 3,131,288 A | 4/1964 | Browning et al. |
| 3,242,305 A | 3/1966 | Kane et al. |
| 3,522,846 A | 8/1970 | New |
| 3,534,388 A | 10/1970 | Ito et al. |
| 3,567,898 A | 3/1971 | Fein |
| 3,619,549 A | 11/1971 | Hogan et al. |
| 3,641,308 A | 2/1972 | Couch, Jr. et al. |
| 3,787,247 A | 1/1974 | Couch, Jr. |
| 3,798,784 A | 3/1974 | Kovats et al. |
| 3,830,428 A | 8/1974 | Dyos |
| 3,833,787 A | 9/1974 | Couch, Jr. |
| 4,067,390 A | 1/1978 | Camacho et al. |
| 4,169,503 A | 10/1979 | Scott |
| 4,203,022 A | 5/1980 | Couch, Jr. et al. |
| 4,265,747 A | 5/1981 | Copa et al. |
| 4,311,897 A | 1/1982 | Yerushalmy |
| 4,344,839 A | 8/1982 | Pachkowski et al. |
| 4,463,245 A | 7/1984 | McNeil |
| 4,531,043 A | 7/1985 | Zverina et al. |
| 4,567,346 A | 1/1986 | Marhic |
| 4,624,765 A | 11/1986 | Cerkanowicz et al. |
| 4,685,963 A | 8/1987 | Saville et al. |
| 4,776,638 A | 10/1988 | Hahn |
| 4,791,268 A | 12/1988 | Sanders et al. |
| 4,886,118 A | 12/1989 | Van Meurs et al. |
| 5,019,268 A | 5/1991 | Rogalla |
| 5,048,404 A | 9/1991 | Bushnell et al. |
| 5,082,054 A | 1/1992 | Kiamanesh |
| 5,132,512 A | 7/1992 | Sanders et al. |
| 5,166,950 A | 11/1992 | Jouvaud et al. |
| 5,326,530 A | 7/1994 | Bridges |
| 5,348,629 A | 9/1994 | Khudenko |
| 5,368,724 A | 11/1994 | Ayres et al. |
| 5,534,232 A | 7/1996 | Denes et al. |
| 5,609,736 A | 3/1997 | Yamamoto |
| 5,609,777 A | 3/1997 | Apunevich et al. |
| 5,628,887 A | 5/1997 | Patterson et al. |
| 5,655,210 A | 8/1997 | Gregoire et al. |
| 5,660,743 A | 8/1997 | Nemchinsky |
| 5,738,170 A | 4/1998 | Laverhne |
| 5,746,984 A | 5/1998 | Hoard |
| 5,760,363 A | 6/1998 | Hackett et al. |
| 5,766,447 A | 6/1998 | Creijghton |
| 5,876,663 A | 3/1999 | Laroussi |
| 5,879,555 A | 3/1999 | Khudenko |
| 5,893,979 A | 4/1999 | Held |
| 5,908,539 A | 6/1999 | Young et al. |
| 5,979,551 A | 11/1999 | Uban et al. |
| 6,007,681 A | 12/1999 | Kawamura et al. |
| 6,117,401 A | 9/2000 | Juvan |
| 6,228,266 B1 | 5/2001 | Shim |
| 6,514,469 B1 | 2/2003 | Kado et al. |
| 6,749,759 B2 | 6/2004 | Denes et al. |
| 6,929,067 B2 | 8/2005 | Vinegar et al. |
| 6,942,786 B1 | 9/2005 | Fosseng |
| 6,987,792 B2 | 1/2006 | Do et al. |
| 7,081,171 B1 | 7/2006 | Sabol et al. |
| 7,086,468 B2 | 8/2006 | De Rouffignac et al. |
| 7,096,953 B2 | 8/2006 | De Rouffignac et al. |
| 7,121,342 B2 | 10/2006 | Vinegar et al. |
| 7,128,816 B2 | 10/2006 | Denes et al. |
| 7,422,695 B2 | 9/2008 | Foret |
| 7,536,975 B2 | 5/2009 | Denes et al. |
| 7,857,972 B2 | 12/2010 | Foret |
| 7,893,408 B2 | 2/2011 | Hieftje et al. |
| 8,074,439 B2 | 12/2011 | Foret |
| 8,278,810 B2 | 10/2012 | Foret |
| 8,324,523 B2 | 10/2012 | Foret |
| 8,568,663 B2 | 10/2013 | Foret |
| 8,810,122 B2 | 8/2014 | Foret |
| 8,833,054 B2 | 9/2014 | Foret |
| 8,904,749 B2 | 12/2014 | Foret |
| 9,051,820 B2 | 6/2015 | Foret |
| 9,105,433 B2 | 8/2015 | Foret |
| 9,111,712 B2 | 8/2015 | Foret |
| 9,163,584 B2 | 10/2015 | Foret |
| 9,185,787 B2 | 11/2015 | Foret |
| 9,230,777 B2 | 1/2016 | Foret |
| 9,241,396 B2 | 1/2016 | Foret |
| 9,445,488 B2 | 9/2016 | Foret |
| 9,499,443 B2 | 11/2016 | Foret |
| 9,516,736 B2 | 12/2016 | Foret |
| 9,560,731 B2 | 1/2017 | Foret |
| 9,644,465 B2 | 5/2017 | Foret |
| 9,699,879 B2 | 7/2017 | Foret |
| 9,761,413 B2 | 9/2017 | Foret |
| 9,781,817 B2 | 10/2017 | Foret |
| 9,790,108 B2 | 10/2017 | Foret |
| 9,801,266 B2 | 10/2017 | Foret |
| 2002/0148562 A1 | 10/2002 | Aoyagi et al. |
| 2003/0024806 A1 | 2/2003 | Foret |
| 2003/0101936 A1 | 6/2003 | Lee |
| 2003/0150325 A1 | 8/2003 | Hyppanen |
| 2003/0179536 A1 | 9/2003 | Stevenson et al. |
| 2003/0213604 A1 | 11/2003 | Stevenson et al. |
| 2004/0020188 A1 | 2/2004 | Kramer et al. |
| 2005/0087435 A1 | 4/2005 | Kong et al. |
| 2005/0151455 A1 | 7/2005 | Sato et al. |
| 2005/0155373 A1 | 7/2005 | Hirooka et al. |
| 2006/0104849 A1 | 5/2006 | Tada et al. |
| 2006/0124445 A1 | 6/2006 | Labrecque |
| 2006/0151445 A1 | 7/2006 | Schneider |
| 2006/0196424 A1 | 9/2006 | Swallow et al. |
| 2007/0104610 A1 | 5/2007 | Houston et al. |
| 2007/0196249 A1 | 8/2007 | Fridman |
| 2007/0240975 A1 | 10/2007 | Foret |
| 2007/0253874 A1 | 11/2007 | Foret |
| 2008/0058228 A1 | 3/2008 | Wilson |
| 2008/0202915 A1 | 8/2008 | Hieftje et al. |
| 2009/0118145 A1 | 5/2009 | Wilson et al. |
| 2009/0200032 A1 | 8/2009 | Foret |
| 2009/0235637 A1 | 9/2009 | Foret |
| 2009/0277774 A1 | 11/2009 | Foret |
| 2010/0212498 A1 | 8/2010 | Salazar |

(56) References Cited

U.S. PATENT DOCUMENTS

| | | |
|---|---|---|
| 2010/0258429 A1 | 10/2010 | Ugolin |
| 2010/0296977 A1 | 11/2010 | Hancock |
| 2011/0005999 A1 | 1/2011 | Randal |
| 2011/0022043 A1 | 1/2011 | Wandke et al. |
| 2011/0031224 A1 | 2/2011 | Severance, Jr. et al. |
| 2011/0223091 A1 | 9/2011 | Miller |
| 2011/0225948 A1 | 9/2011 | Valeev et al. |
| 2011/0303532 A1 | 12/2011 | Foret |
| 2012/0097648 A1 | 4/2012 | Foret |
| 2012/0205293 A1 | 8/2012 | Thanoo |
| 2012/0227968 A1 | 9/2012 | Eldred et al. |
| 2013/0020926 A1 | 1/2013 | Foret |
| 2014/0238861 A1 | 8/2014 | Foret |
| 2014/0260179 A1 | 9/2014 | Foret |
| 2015/0103860 A1 | 4/2015 | Foret |
| 2015/0323174 A1 | 11/2015 | Foret |
| 2015/0323175 A1 | 11/2015 | Foret |
| 2016/0307733 A1 | 10/2016 | Foret |
| 2017/0037307 A1 | 2/2017 | Foret |
| 2017/0111985 A1 | 4/2017 | Foret |
| 2017/0135191 A1 | 5/2017 | Foret |
| 2017/0211360 A1 | 7/2017 | Foret |

FOREIGN PATENT DOCUMENTS

| | | |
|---|---|---|
| EP | 1707096 A2 | 10/2006 |
| EP | 1915940 A1 | 4/2008 |
| GB | 1224638 A | 3/1971 |
| JP | 2006-501980 A | 1/2006 |
| JP | 2008238053 A | 10/2008 |
| KR | 101999009569 A | 2/1999 |
| KR | 10-2004-0005107 A | 1/2004 |
| WO | 9904607 A1 | 1/1999 |
| WO | 2007117634 A2 | 10/2007 |

OTHER PUBLICATIONS

Brandt, A. R., "Converting Green River oil shale to liquid fuels with Alberta Taciuk Processor: energy inputs and greenhouse gas emissions," Jun. 1, 2007.

Brandt, A. R., "Converting Green River oil shale to liquid fuels with the Shell in-situ conversion process: energy inputs and greenhouse gas emissions," Jun. 30, 2007.

International Search Report [KIPO] PCT/US201/062941 dated Jan. 27, 2014.

International Search Report and Written Opinion for PCT/US2008/011926 dated Apr. 27, 2009.

International Search Report and Written Opinion for PCT/US2009/000937 dated Sep. 17, 2009.

Kavan, L., "Electrochemical Carbon," Chem Rev (1997), 97:3061-3082.

Understanding in-situ combustion, www.HeavyOilinfo.com, accessed Oct. 16, 2007.

Unleashing the potential: Heavy Oil, Supplement to E&P Annual Reference Guide, www.eandp.info.com, Jun. 2007.

PCT/US2014/2014/024991 [KIPO] International Search Report dated Aug. 6, 2014.

PCT/US2014/030090 [KIPO] International Search Report dated Sep. 25, 2014.

Metalliferous Mining—Processing Cyclones Resource Book "—Aug. 2010, provided at https://rsteyn.files.wordpress.com/201 0/07/cyclones-basics.pdf".

Extended European Search Report for EP 08840081.7 dated May 28, 2014.

Extended European Search Report for EP 09710927.6 dated Jan. 21, 2014.

Extended European Search Report for EP 14764029.6 dated Dec. 14, 2015.

International Search Report and Written Opinion for PCT/US2009/033979 dated Sep. 15, 2009.

SYSTEM, METHOD AND APPARATUS FOR PLASMA ARC WELDING CERAMICS AND SAPPHIRE

PRIORITY CLAIM AND CROSS-REFERENCE TO RELATED APPLICATIONS

This patent application claims priority to and is: (1) a non-provisional patent application of U.S. Provisional Patent Application Ser. No. 62/144,701 filed on Apr. 8, 2015; and (2) a continuation-in-part of U.S. patent application Ser. No. 14/560,808 filed on Dec. 4, 2014 and entitled "Inductively Coupled Plasma Arc Device", which is a continuation patent application of U.S. patent application Ser. No. 13/282,455 filed on Oct. 26, 2011, now U.S. Pat. No. 8,904,749 and entitled "Inductively Coupled Plasma Arc Device," which is a continuation-in-part patent application of U.S. patent application Ser. No. 12/370,591 filed on Feb. 12, 2009, now U.S. Pat. No. 8,074,439 and entitled "System, Method and Apparatus for Lean Combustion with Plasma from an Electrical Arc," which is a non-provisional patent application of U.S. provisional patent application Ser. No. 61/027,879 filed on Feb. 12, 2008 and entitled, "System, Method and Apparatus for Lean Combustion with Plasma from an Electrical Arc." The entire contents of the foregoing patents and patent applications are incorporated herein by reference.

This patent application is also related to: (1) U.S. patent application Ser. No. 14/036,044 filed on Sep. 25, 2013, now U.S. Pat. No. 9,105,433 and entitled "Plasma Torch", and the patents and patent applications to which it claims priority to; (2) U.S. patent application Ser. No. 14/326,560 filed on Jul. 8, 2014, now U.S. Pat. No. 9,241,396 and entitled "Method for Operating a Plasma Arc Torch Having Multiple Operating Modes", and the patents and patent applications to which it claims priority to; and (3) U.S. Pat. No. 7,422,695 and U.S. Pat. No. 7,857,972 and multiple patents and patent applications that claim priority thereto. All of the foregoing patents and patent applications are hereby incorporated by reference in their entirety.

FIELD OF THE INVENTION

The present invention relates generally to the field of plasma arc welding non-electrically conductive materials. More specifically the present invention relates to a system, method and apparatus for joining ceramics via synergistically combining induction heating with plasma arc welding ("PAW"). Very specifically, the present invention relates to a method for welding sapphire by induction heating a backing electrode for transferring heat to the sapphire prior to plasma arc welding the sapphire. Likewise, the present invention is related to a system, method and apparatus for post heat treating the welded ceramics and sapphire.

BACKGROUND OF THE INVENTION

The United States Military, as well as many other Security Forces ranging from police to private security details in addition to NASA are in dire need of high temperature transparent armor, tubing, sheet and rods. Sapphire is an engineered material for high temperature transparent applications. Sapphire has a high melting point close to 2,053° C. and can be used above 2,000° C. Single crystal alpha alumina typically referred to as sapphire can be found in nature. Sapphire is aluminum oxide ($\alpha$-$Al_2O_3$). However, for use in transparent armor or transparent tubing, sheets, piping and/or rods it is typically grown starting with a crystal seed. The formation of single crystal sapphire can be accomplished using techniques such as the Czochralski Method, Edge-Defined Film Fed Growth (EFG), or Kyropoulos Method, or other techniques depending upon the desired size and shape of the boule, and the orientation of the crystal. Hence, the cost of synthetically grown sapphire is very expensive.

A severe disadvantage for using sapphire is that it can only be grown to certain dimensions for tubing, rods and sheets. Consequently, to manufacture larger parts, the small sapphire sheets or windows must be joined together to make a large window. Likewise, tubing can only be grown to certain diameters and lengths. Consequently, two or more tubes must be joined to make a longer tube.

With the ever-increasing use of Improvised Explosive Devices ("IEDs") there exists an immediate need for transparent armor. However, the lack of a joining and/or welding process for sapphire has hindered its use and thus limited its use for small windows. Heretofore, the word "welding" will be used to encompass a means for joining sapphire by sintering, melting and/or fusing separate sapphire pieces such as whole sheets, tubes, rods or as separate individual granular or bead material such as crushed boule, alumina powder or green alumina ceramic beads by means of coalescence.

Although many other joining processes can be enumerated, in order to be brief the term "welding" and "plasma arc welding" as used herein refers to sintering, fusing and in particular coalescence of materials due to heating.

Plasma is primarily used for cutting metal, plasma spraying, analysis of gases via IC Mass Spectrometry, plasma TVs, plasma lighting and expensive production of nanopowders. One of the major drawbacks for using plasma for other applications is the complexity and cost of existing systems. As a result, current plasma systems are not widely used for steam reforming, cracking, gasification, partial oxidation, pyrolysis, heating, melting, sintering, rich combustion and/or lean combustion.

The major unresolved issue with current commercially available plasma torches that use inertia confinement is that there is only one fluid exit—through the nozzle—for confining the plasma. Moreover, these systems must rely on controlling or regulating the upstream gas flow in order to ignite, sustain and confine the plasma. These problems have plagued the plasma industry and thus plasma torches are viewed as difficult to operate due to the power supplies, controls, gases and valves associated with the torches. The problem associated with valves and gas regulators is evermore pronounced with plasma arc welding ("PAW"). The use of valves and regulators for plasma cutting are much larger and flow more gas then the regulators for plasma arc welding. Likewise, the power supplies associated with plasma arc welding operate at lower voltages then plasma cutting. Keyhole plasma arc welding requires very high power levels. Consequently, plasma arc welding ceramics requires full penetration to an electrically conductive material if the plasma arc welder is operated in a transferred-arc mode.

Accordingly, there is a need for a plasma system that is less complex, lower in cost and more efficient than current systems in order for plasma to be accepted as a mainstream device for use in the aforementioned applications and processes, for example welding ceramics and non-conductive materials, such as sapphire.

SUMMARY OF THE INVENTION

The present invention provides an inductively coupled plasma device that is less complex, lower in cost and more efficient than current systems in order for plasma to be accepted as a mainstream device for use in the aforementioned applications and processes. The devices described herein reduce the complexity of gas regulation (upstream and downstream fluid flow), current control, voltage control, plasma ignition, sustainment and confinement by using a moveable electrode in combination with an electrode nozzle, a tangential entry and exit, and a wave energy source selected from electromagnetic radiation ("EMR") within the radio frequency ("RF") range all the way to a line frequency of 50 or 60 Hz. As a result, the present invention opens the door for wide scale use of plasma for heavy industrial applications as well as commercial, residential and transportation applications.

One embodiment of the present invention provides a method for plasma arc welding at least two ceramic or sapphire pieces together. A plasma torch is provided that includes a cylindrical vessel having a first end and a second end, a tangential inlet connected to or proximate to the first end, a tangential outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that the center line of the hollow electrode nozzle is aligned with the longitudinal axis of the cylindrical vessel. A second electrode is positioned proximate to the hollow electrode nozzle. The two ceramic or sapphire pieces are placed between the second electrode and the hollow electrode. The two ceramic or sapphire pieces are welded together with the plasma exiting from the hollow electrode by means of transferring the arc from the electrode through the hollow electrode and to the second electrode.

Another embodiment of the present invention provides a device for plasma arc welding at least two ceramic or sapphire pieces together. The device includes a cylindrical vessel having a first end and a second end, a tangential inlet connected to or proximate to the first end, and a tangential outlet connected to or proximate to the second end. An electrode housing is connected to the first end of the cylindrical vessel such that a first electrode is (a) aligned with a longitudinal axis of the cylindrical vessel, and (b) extends into the cylindrical vessel. A hollow electrode nozzle is connected to the second end of the cylindrical vessel such that the center line of the hollow electrode nozzle is aligned with the longitudinal axis of the cylindrical vessel. A second electrode positioned proximate to the hollow electrode nozzle such that the ceramic or sapphire is positioned between the second electrode and the hollow electrode. The tangential inlet and the tangential outlet create a vortex within the cylindrical vessel, and the first electrode and the hollow electrode nozzle create a plasma that discharges through the hollow electrode nozzle and couples to the second electrode such that the two pieces of ceramic or sapphire are welded together.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to plasma arc welding ceramics and sapphire, but it will be understood that the concepts of the present invention are applicable to the manufacture or processing of particles at high temperatures.

The present invention provides a means for manufacturing net shape sapphire structures utilizing sapphire in the form of rods, sheets, tubes and/or crushed boule. Likewise, the present invention provides a means for flash sintering green ceramics.

Figure 1:
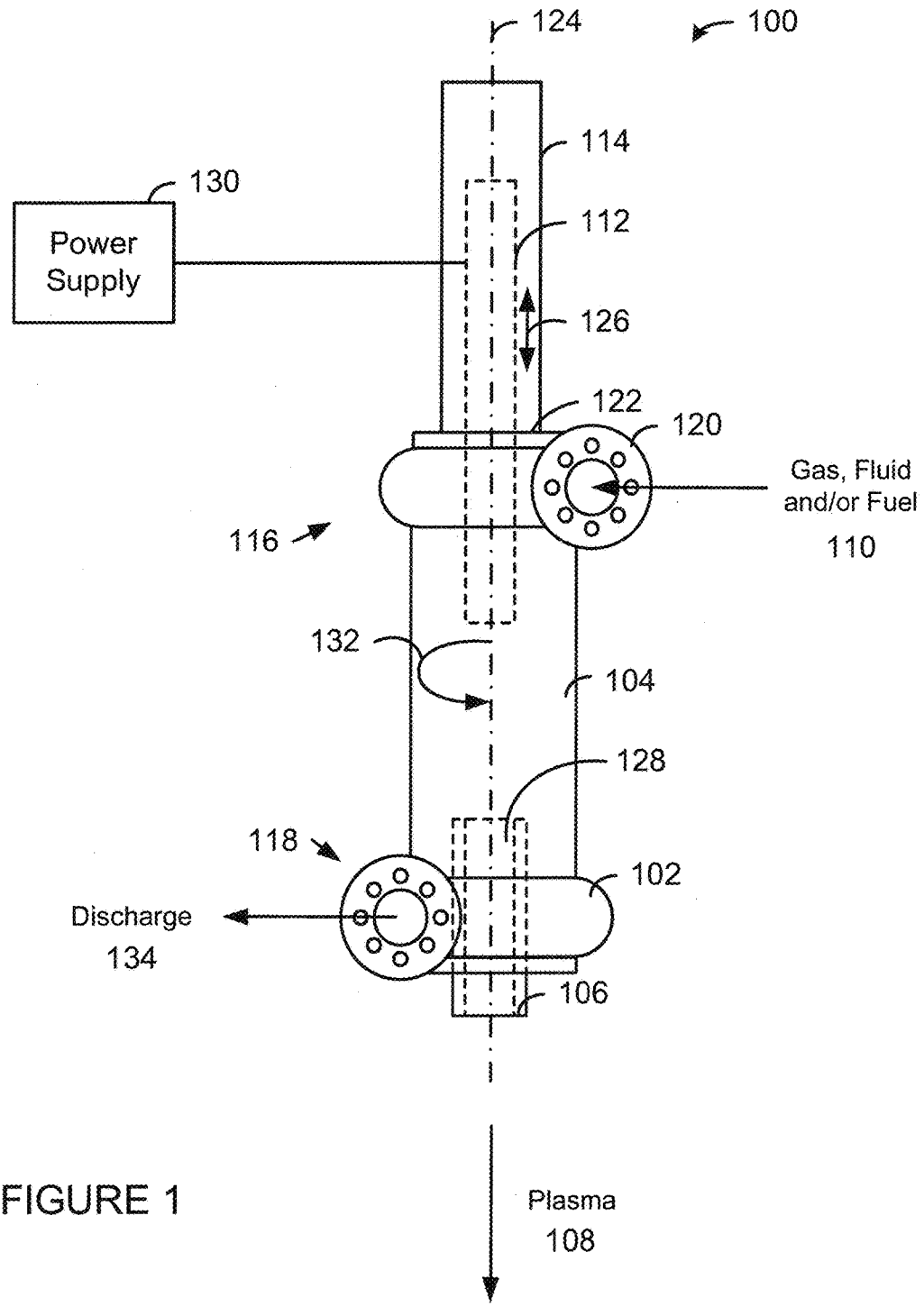
FIG. 1 is a diagram of a plasma arc torch in accordance with one embodiment of the present invention.

Now referring to FIG. 1, a plasma arc torch 100 in accordance with one embodiment of the present invention is shown. The plasma arc torch 100 is a modified version of the ARCWHIRL® device disclosed in U.S. Pat. No. 7,422,695 (which is hereby incorporated by reference in its entirety) that produces unexpected results. More specifically, by attaching a discharge volute 102 to the bottom of the vessel 104, closing off the vortex finder, replacing the bottom electrode with a hollow electrode nozzle 106, an electrical arc can be maintained while discharging plasma 108 through the hollow electrode nozzle 106 regardless of how much gas (e.g., air), fluid (e.g., water) or steam 110 is injected into plasma arc torch 100. In addition, when a valve (not shown) is connected to the discharge volute 102, the mass flow of plasma 108 discharged from the hollow electrode nozzle 106 can be controlled by throttling the valve (not shown) while adjusting the position of the first electrode 112 using the linear actuator 114.

As a result, plasma arc torch 100 includes a cylindrical vessel 104 having a first end 116 and a second end 118. A tangential inlet 120 is connected to or proximate to the first end 116 and a tangential outlet 102 (discharge volute) is connected to or proximate to the second end 118. An electrode housing 122 is connected to the first end 116 of the cylindrical vessel 104 such that a first electrode 112 is aligned with the longitudinal axis 124 of the cylindrical vessel 104, extends into the cylindrical vessel 104, and can be moved along the longitudinal axis 124. Moreover, a linear actuator 114 is connected to the first electrode 112 to adjust the position of the first electrode 112 within the cylindrical vessel 104 along the longitudinal axis of the cylindrical vessel 124 as indicated by arrows 126. The hollow electrode nozzle 106 is connected to the second end 118 of the cylindrical vessel 104 such that the center line of the hollow electrode nozzle 106 is aligned with the longitudinal axis 124 of the cylindrical vessel 104. The shape of the hollow portion 128 of the hollow electrode nozzle 106 can be cylindrical or conical. Moreover, the hollow electrode nozzle 106 can extend to the second end 118 of the cylindrical vessel 104 or extend into the cylindrical vessel 104 as shown. As shown in FIG. 1, the tangential inlet 120 is volute attached to the first end 116 of the cylindrical vessel 104, the tangential outlet 102 is a volute attached to the second end 118 of the cylindrical vessel 104, the electrode housing 122 is connected to the inlet volute 120, and the hollow electrode nozzle 106 (cylindrical configuration) is connected to the discharge volute 102. Note that the plasma arc torch 100 is not shown to scale.

A power supply 130 is electrically connected to the plasma arc torch 100 such that the first electrode 112 serves as the cathode and the hollow electrode nozzle 106 serves as the anode. The voltage, power and type of the power supply 130 is dependant upon the size, configuration and function of the plasma arc torch 100. A gas (e.g., air), fluid (e.g., water) or steam 110 is introduced into the tangential inlet 120 to form a vortex 132 within the cylindrical vessel 104 and exit through the tangential outlet 102 as discharge 134. The vortex 132 confines the plasma 108 within in the vessel 104 by the inertia (inertial confinement as opposed to magnetic confinement) caused by the angular momentum of the vortex, whirling, cyclonic or swirling flow of the gas (e.g., air), fluid (e.g., water) or steam 110 around the interior of the cylindrical vessel 104. During startup, the linear actuator 114 moves the first electrode 112 into contact with the hollow electrode nozzle 106 and then draws the first electrode 112 back to create an electrical arc which forms the plasma 108 that is discharged through the hollow electrode nozzle 106. During operation, the linear actuator 114 can adjust the position of the first electrode 112 to change the plasma 108 discharge or account for extended use of the first electrode 112.

Figure 2:
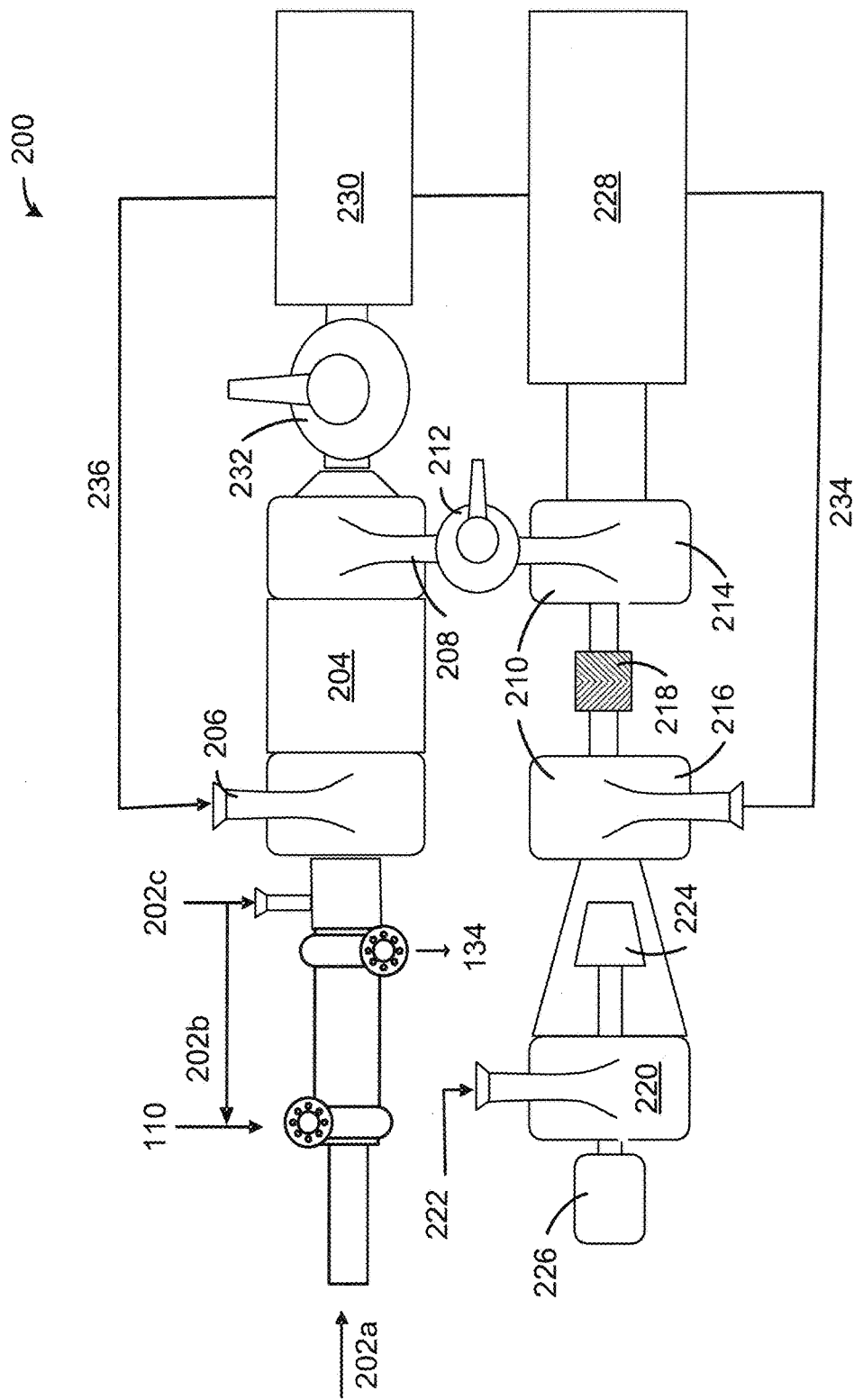
FIG. 2 is a diagram of a Supersonic Lean Combustion Plasma Turbine in accordance with one embodiment of the present invention.

Referring now to FIG. 2, a diagram of a Supersonic Lean Combustion Plasma Turbine 200 in accordance with one embodiment of the present invention is shown. In order to gasify, crack, reform or pyrolyize fuel, the fuel 202 may be introduced into the system at one or more points: (a) introducing the fuel 202a into the plasma 108 directly through first electrode 112 wherein the first electrode 112 is hollow; (b) mixing (e.g., via an eductor) the fuel 202b with the gas (e.g., air), fluid (e.g., water) or steam 110 introduced into the tangential inlet 120 of the plasma arc torch 100; and (c) introducing (e.g., via an eductor) the fuel 202c into the plasma 108 plume exiting the hollow electrode nozzle 106. The plasma arch torch 100 is connected to a cyclone combustor 204 with a tangential entry 206 and tangential exit 208. The cyclone combustor 204 is connected to a turbocharger 210 via valve 212. Hot gases enter into a turbine 214 of the turbocharger 210. The turbine 214 rotates a compressor 216 by means of a shaft with a pinion 218. A compressor inlet valve 220 is connected to the compressor 216. Compressor inlet valve 220 eliminates the need for stators to impart a whirl flow to match the compressor wheel rotation direction. In addition, by utilizing a tapered reducer for the housing the velocity of the air 222 must increase in order to conserve angular momentum. By utilizing a plunger style stopper valve assembly 224 coupled to a linear actuator 226, the mass flow can be pinched or reduced while maintaining velocity. The physical separation of the compressor/turbine or turbocharger 210 from the combustor 204 allows for a radically different design for gas turbines, power plants and airframes. The turbocharger 210 can be located and oriented to maximize airflow while minimizing foreign object damage (FOD). In addition, the turbocharger 210 may be coupled to rotating unions and tubing in order to rotate or direct the exhaust from the turbine 214 for thrust vectoring. In order to maximize efficiency a first stage recuperator 228 is placed on the discharge exhaust from the turbine 214 and a second stage recuperator 230 is place on the discharge exhaust from the combustor 204 via a valve 232. Compressed air 234 enters into the first stage recuperator 228 and then into the second stage recuperator 230. The hot compressed air 236 then enters into the combustor 204 via a volute with tangential entry 206.

More specifically, the compressor inlet valve 220 includes a volute with a tangential entry, a cone-shaped reducer connected to the volute, a linear actuator connected to the volute, and a cone-shaped stopper disposed within the cone-shaped reducer and operably connected to the linear actuator. A controller is connected to the linear actuator to adjust a gap between the cone-shaped stopper and the cone-shaped reducer to increase or decrease mass flow while maintaining whirl velocity to closely match compressor tip velocity.

Although there are several variations and modes of operations a few brief examples will be given in order to quickly demonstrate the uniqueness as well as functionality of the Supersonic Lean Combustion Plasma Turbine 200. A vortex is formed within the plasma arc torch 100 using water, steam, fuel or any other fluid 110. The arc is struck and a plasma is discharged into the eye of the cyclone combustor 204. The plasma syngas plume entering into the cyclone combustor 204 is also the igniter. Since it is in the eye of the cyclone it will be extended along the longitudinal axis of the combustor 204 and into valve 232. By throttling valves 212 and 232 the turbine can be operated from a takeoff mode and transition to supersonic and hypersonic flight. The purpose of the pinion 218 on the turbocharger 210 in combination with separating the combustor 204 from the compressor 216 and turbine 214 allows for a unique and completely unobvious mode of operation.

Figure 3:
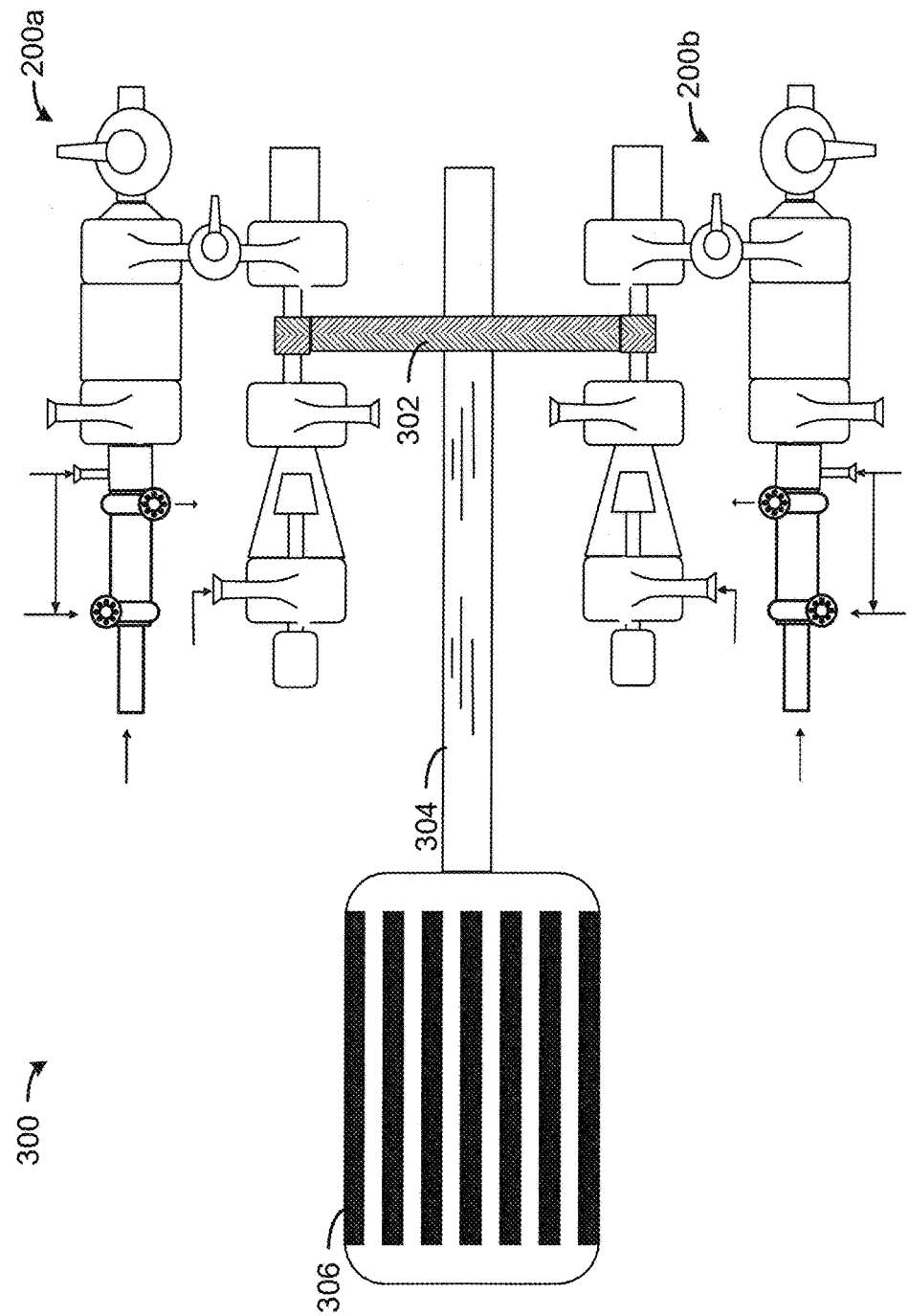
FIG. 3 is a diagram of a Supersonic Lean Combustion Plasma Turbine Motor Generator in accordance with another embodiment of the present invention.

Referring now to FIG. 3, a diagram of a Supersonic Lean Combustion Plasma Turbine Motor Generator 300 in accordance with another embodiment of the present invention is shown. Two or more Plasma Turbines 200 (200a and 200b as shown) are coupled to a bull gear 302 in a locked-train fashion. The bull gear 302 drives a motor generator 306 via drive shaft 304. This configuration allows for operating in a very fuel efficient and cost effective means. The first Plasma Turbine 200a is started by using the motor to rotate the pinions in order to rotate the compressor. The cyclone valve's stopper is opened to allow air into the compressor. The second Plasma Turbine's 200b stopper is placed in a closed position in order to unload the compressor. This can also be accomplished by placing electrical clutches on the pinion. When air flow enters into the combustor, the plasma arc torch 100 is ignited with only water or steam flowing through it in the same rotational direction as the cyclone combustor. Once the plasma arc is stabilized fuel is flowed into the plasma arc torch 100 and gasified and synthesized into hydrogen and carbon monoxide. The hot syngas plasma flows into the cyclone combustor. It is ignited and lean combusted and flowed out of the combustor via the tangential exit. Valve is fully opened while valve is shut in order to maximize flow into the turbine. Valves and are then adjusted according to torque loading on the pinion in addition to turbine and compressor speed.

By operating only one combustor at its maximum efficiency the generator can be operated as a spinning reserve. All utility companies within the US are required to maintain "Spinning Reserves." In order to come up to full power additional Plasma Turbines can be started almost instantly with very little lag time. This annular Plasma Turbine configuration may have multiple bull gears on a single shaft with each bull gear consisting of multiple Plasma Turbines.

Figure 4:
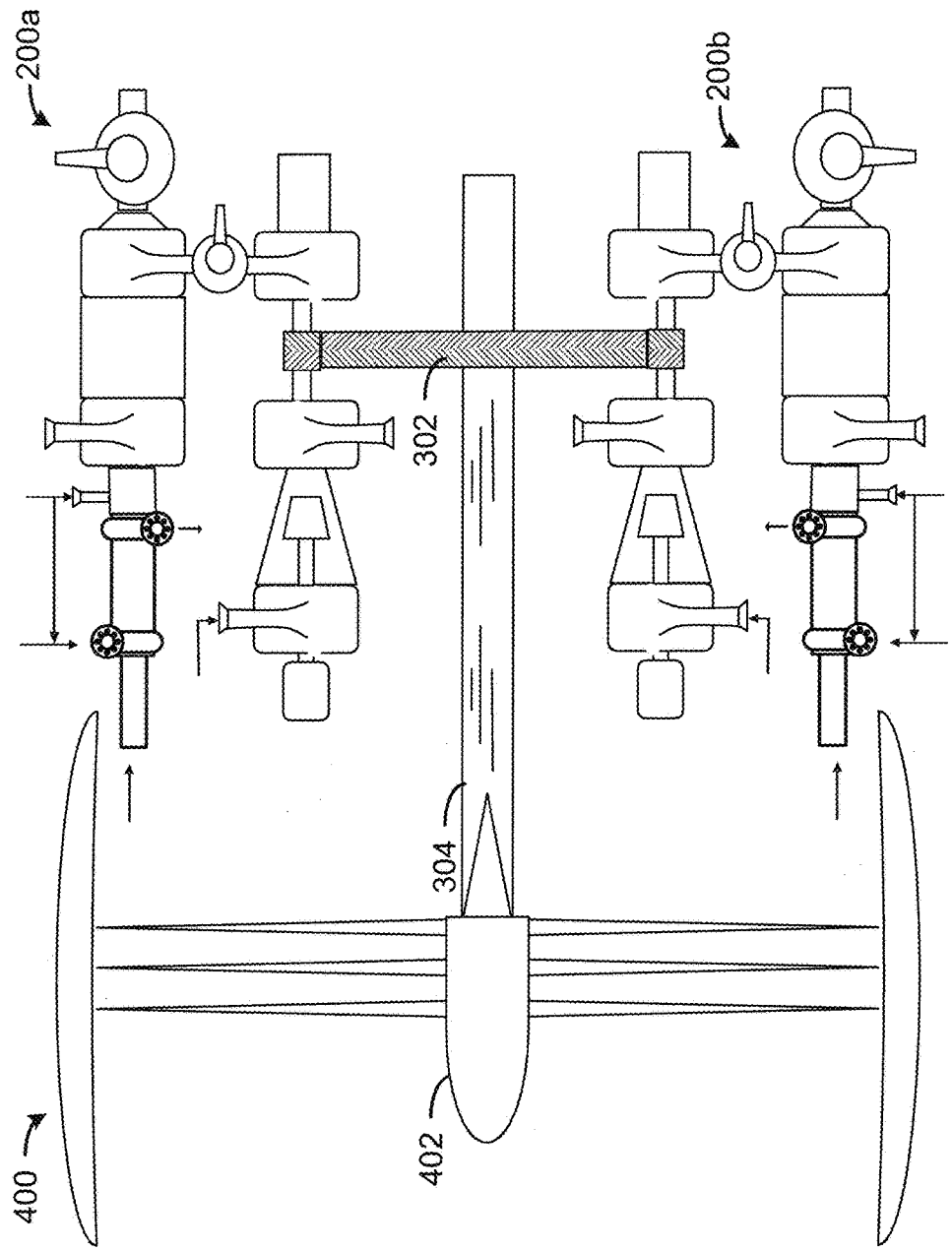
FIG. 4 is a diagram of a Supersonic Lean Combustion Plasma Turbine High Bypass Fan in accordance with another embodiment of the present invention.

Now referring to FIG. 4, a diagram of a Supersonic Lean Combustion Plasma Turbine High Bypass Fan 400 in accordance with another embodiment of the present invention is shown. Two or more Plasma Turbines 200 (200a and 200b as shown) are coupled to a bull gear 302 in a locked-train fashion. A high bypass fan 402 is attached to the shaft 304. Likewise, a small motor generator may be attached to the opposite end of the shaft for starting and inflight electrical needs. Once again the Plasma Turbine configuration allows for maximizing fuel efficiency while idling at the gate and taxing by operating only one Plasma Turbine attached to the bull gear. Prior to takeoff all Plasma Turbines are brought online to maximize thrust. After takeoff Plasma Turbines may be taken offline to maximize fuel efficiency during climbout and at cruise altitude and speed.

When the pilot is ready to transition to supersonic flight the turbine inlet valve is slowly closed while the combustor valve is opened. The high bypass fan may be feathered in order to reduce speed of the bull gear or to reduce drag. Likewise an inlet cowling may be used to close air flow to the high bypass fan. Air flow into the combustor is directly due to speed of the aircraft. This is accomplished with an additional three way valve (not shown) connected to the combustor tangential entry. Thus, the combination of the plasma arc torch 100 and the cyclone combustor coupled to a unique exhaust valve allows for a true plasma turbine scramjet that can be operated in a supersonic lean fuel combustion mode.

Figure 5:
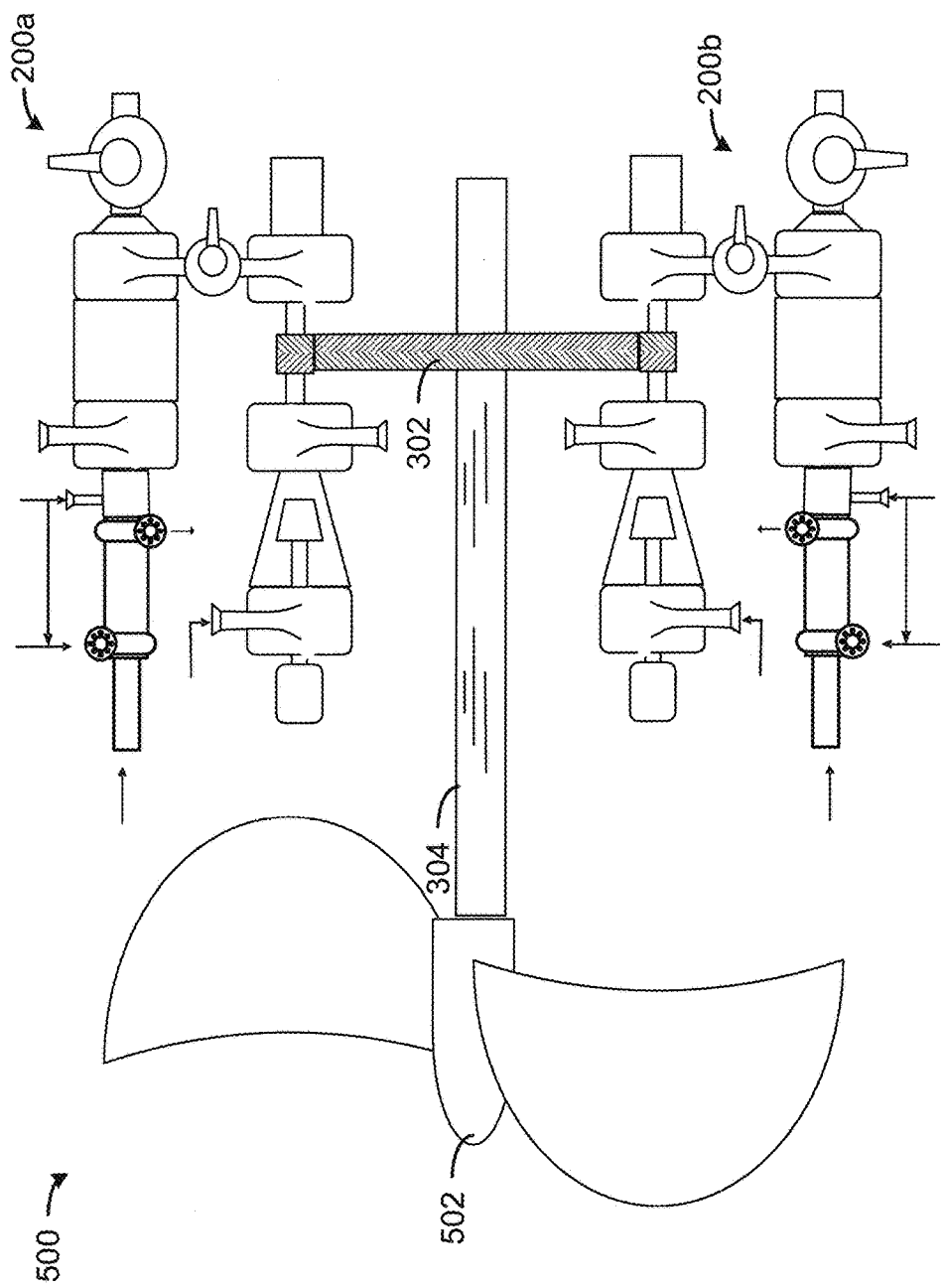
FIG. 5 is a diagram of a Supersonic Lean Combustion Plasma Turbine Propeller in accordance with another embodiment of the present invention.

Referring to FIG. 5, a diagram of a Supersonic Lean Combustion Plasma Turbine Propeller 500 in accordance with another embodiment of the present invention is shown, which is similar to the motor generator and high bypass fan, the system allows for a very unique marine turbine. In comparison, the US Navy's Spruance class destroyers were one of the first class of Naval ships to utilize high powered marinized aircraft turbines. Two GE LM-2500 Gas Turbine Engines were coupled to the port shaft via a bull gear and two GE LM-2500 Gas Turbine Engines were coupled to the starboard shaft via a bull gear. This gave the ship a total of 100,000 shaft horsepower. In order to operate in the most fuel efficient mode, only one engine was operated while the other engine was decoupled from the bull gear via a friction and spur gear type clutch. The other shaft was placed in a trail mode position and allowed to spin or rotate freely. If full power was needed the other 3 gas turbine engines required about 3 minutes to start in an emergency mode.

There were two major problems associated with the LM-2500 coupled to a bull gear. First, when starting from a dead in the water position, the engineers had to conduct a dead shaft pickup. This required engaging the clutch and placing the friction brake on which held the power turbine. The turbine was started and hot gases flowed across a non-moving power turbine section. The brake was released and the power turbine rotated thus turning the bull gear. The variable pitched propeller was usually placed at zero pitch.

Returning back to FIG. 5, the bull gear 302 with multiple Plasma Turbines 200 (200a and 200b are shown) may be attached to a drive shaft 304 that is connected to a propeller 502. However, this system can be greatly augmented with a motor generator (not shown) directly attached to the drive shaft 304. In fact, the propeller 502 can be eliminated and replaced with an all electric drive pod. Thus, FIG. 3 would be installed and simply would provide electrical power to the electric drive pod. Neither rotating a shaft for transportation and propulsion purposes nor rotating a large motor generator may be required from the Plasma Turbine System.

Figure 6:
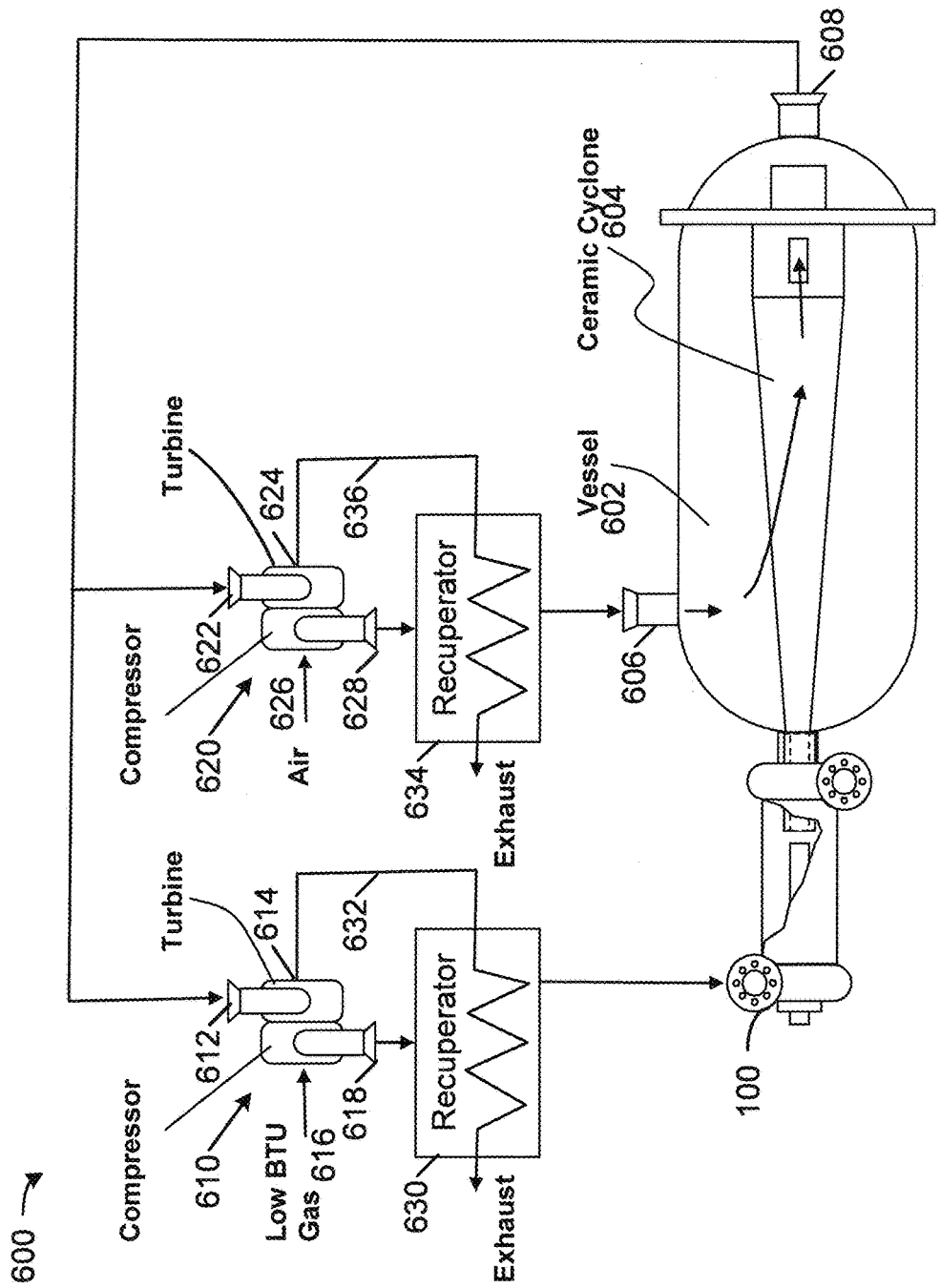
FIG. 6 is a diagram of a Plasma Turbine Thermal Oxidizer in accordance with another embodiment of the present invention.

Now referring to FIG. 6, a diagram of Plasma Turbine Thermal Oxidizer 600 in accordance with another embodiment of the present invention is shown. The plasma arc torch 100 is attached to a commonly available filter vessel 602 which houses a ceramic hydrocylone 604. Ceramic hydrocyclones 604 are available from CoorsTek and Natco.

More specifically, the vessel 602 has an air intake 606, a discharge exhaust 608 and houses at least one ceramic cyclone combustor 604 connected to the hollow electrode nozzle of the plasma arc torch 100. A first turbocharger 610 has a first turbine entry 612, a first turbine exit 614, a first compressor entry 616 and a first compressor exit 618. A second turbocharger 602 has a second turbine entry 622, a second turbine exit 624, a second compressor entry 626 and a second compressor exit 628. The first turbine entry 612 and the second turbine entry 622 are connected to the discharge exhaust 608 of the vessel 602. A first recuperator 630 is connected to the first turbine exit 614, the first compressor exit 618 and the tangential input of the plasma arc torch 100 such that a compressed fuel from the first compressor exit 618 is heated by a first exhaust 632 from the first turbine exit 614 and enters the tangential input of the plasma arc torch 100. A second turbocharger 620 has a second recuperator 634 connected to the second turbine exit 624, the second compressor exit 628 and the air intake 606 of the vessel 602 such that a compressed air from the second compressor exit 628 is heated by a second exhaust 636 from the second turbine exit 624 and enters the air intake 606 of the vessel 602.

Many landfills as well as wastewater treatment plants produce a low BTU fuel referred to as biogas. Likewise, many industries produce a very low BTU offgas that must be thermally oxidized or incinerated. The plasma turbine thermal oxidizer achieves lean combustion by first gasifying the low BTU fuel in another low BTU fuel—syngas. However, since the syngas has a larger ignition range (LEL to UEL) it can be combusted at high flow rates without additional fuel.

The system is operated in the following mode. The plasma arc torch 100 is turned on to establish an arc. Water or steam may be flowed in the plasma arc torch 100 to form the whirl or vortex flow. Air is flowed into a compressor through a recuperator and into the vessel. The air surrounds and cools the ceramic cyclone combustor. The air enters into the ceramic hydrocyclone tangentially then exits as a hot gas into the turbines. Once air flow is established the low BTU gas is flowed into a compressor then into a recuperator. The hot low BTU gas is flowed into the plasma arc torch 100 where it is steam reformed into syngas. Once again, the syngas plasma enters into apex valve of the ceramic cyclone combustor. The syngas is lean combusted and traverses to the turbine, recuperator and then exhausted for additional uses. In this system, the turbochargers may be installed with high speed alternators for providing electricity to operate the power supplies for the plasma arc torch 100.

This system is especially useful at wastewater treatment plants ("WWTPs"). Biogas is often produced from digesters. Likewise, all WWTPs use air to aerate wastewater. Since the Plasma Turbine Thermal Oxidizer operates in a lean fuel combustion mode, there is ample oxygen left within the exhaust gas. This gas can be used for aerating wastewater. Likewise, plasma arc torch 100 can be used to disinfect water while steam reforming biogas. In addition, biosolids can be gasified with the plasma arc torch 100 to eliminate disposal problems and costs.

Figure 7:
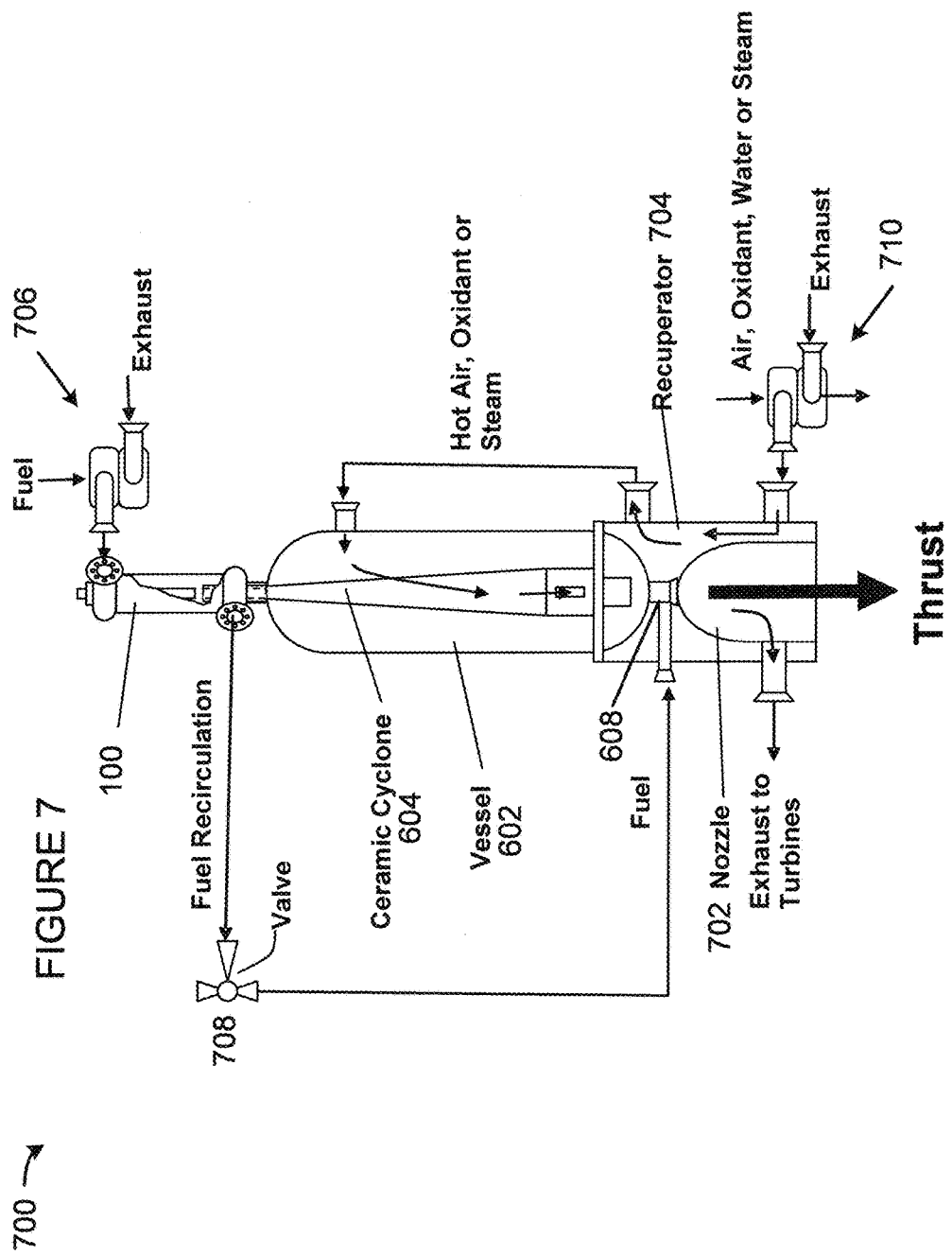
FIG. 7 is a diagram of a Plasma Turbine Air Breathing & Steam Rocket with Recuperator in accordance with another embodiment of the present invention.

Referring now to FIG. 7, a diagram of a Plasma Turbine Air Breathing & Steam Rocket with Recuperator 700 in accordance with another embodiment of the present invention is shown. The thermal oxidizer 600 of FIG. 6 can easily be converted into a rocket or process heater. A nozzle 702 and recuperator 704 are attached to the outlet 608 of the combustor 604. Air or an oxidant are flowed into the recuperator 704. The hot air or oxidant exits the recuperator 704 and enters into the vessel 602 and into the ceramic cyclone combustor 604. Fuel is pressurized via a turbocompressor 706 and enters into the plasma arc torch 100 where it is converted or cracked into syngas. The syngas plasma plume ejecting into the ceramic cyclone combustor 604 is controlled via a multi-position fuel recirculation valve 708. A portion of the fuel may flow into the nozzle 702 to increase thrust. In order to drive the turbines a portion of the hot exhaust gas is scavenged and flowed to the inlets of the fuel turbocompressor 706 and turbocharger 710. When used as an air breathing rocket, upon reaching altitudes where lean combustion cannot be sustained due a lack of oxygen molecules, in lieu of carrying an oxidant, the rocket would carry water. The water in pumped into the recuperator 704 to generate steam. The turbocharger 710 is valved such that it can pull a vacuum on the recuperator 704. The turbocharger 710 is then operated as a vapor compressor. The compressed steam is flowed in the vessel 602. The extremely hot syngas reacts with the steam in the ceramic cyclone combustor 604 for conversion to hydrogen and carbon dioxide via the water gas shift reaction. Since the water gas shift reaction is exothermic this will ensure that the steam remains in the vapor state. A small amount of liquid oxidizer may be added to combust the hydrogen.

The present invention provides a method for supersonic lean fuel combustion by creating an electric arc, generating a whirl flow to confine a plasma from the electric arc, generating a combustion air whirl flow, extracting a rotational energy from one or more hot gases, recuperating energy from the hot gases, and utilizing the electrical arc for converting fuel to syngas while confining the plasma to the vortex of the whirling combustion air in order to maintain and hold a flame for supersonic combustion while coupled to a means for extracting rotational energy from the hot lean combustion exhaust gas while recuperating energy for preheating the fuel and combustion air.

Figure 8:
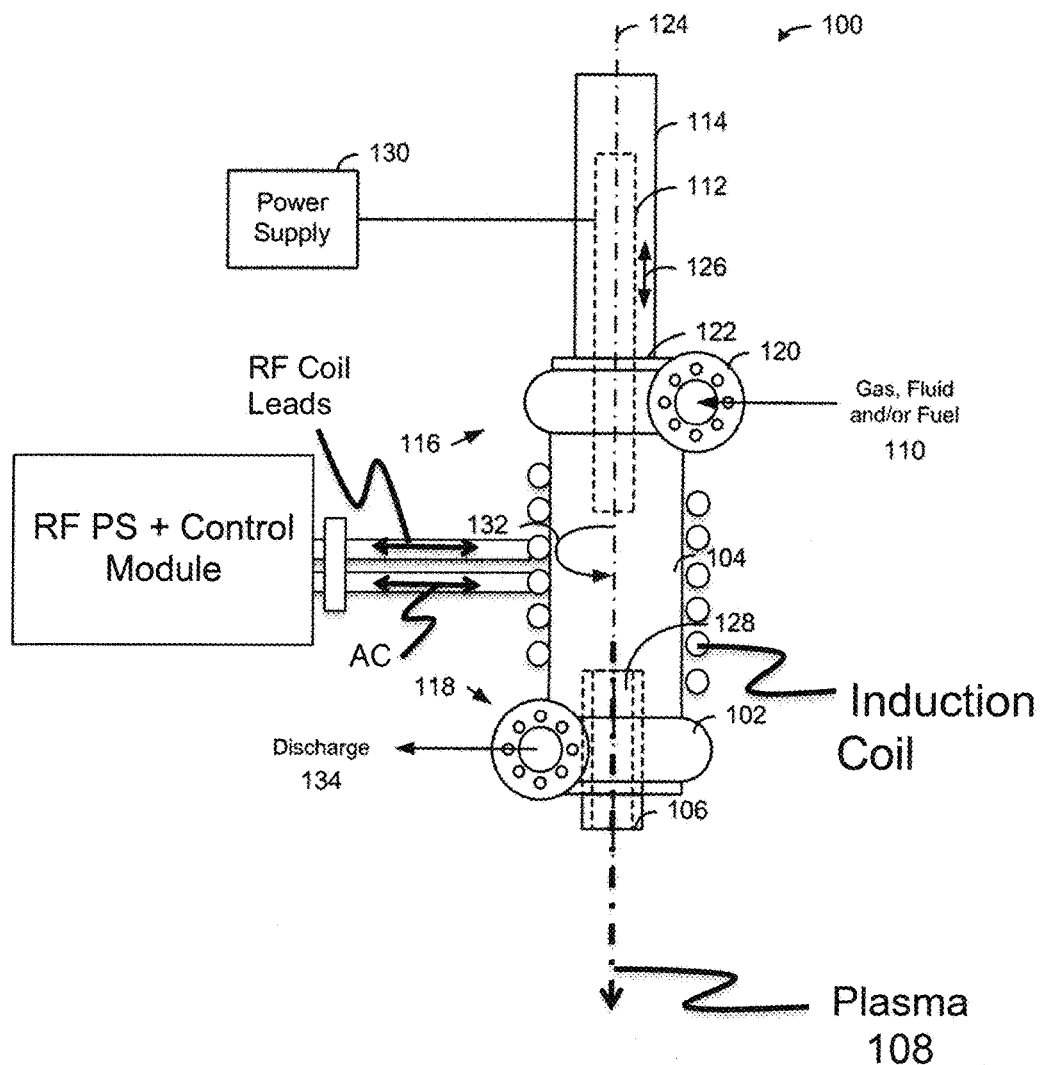
FIG. 8 is a diagram of a RF inductively coupled plasma arc torch in accordance with one embodiment of the present invention.

Now referring to FIG. 8, an inductively coupled ("IC") plasma arc torch is illustrated in another embodiment of the present invention. Inductively coupled plasma torches are well known and well understood. Further elaboration is not necessary in order to understand and operate the present invention. However, a brief introduction to induction heating will help to understand the problems associated with current designs of IC plasma torches. Ameritherm, Inc. located in Scottsville, N.Y., explains induction heating as:

"Induction heating is a method of providing fast, consistent heat for manufacturing applications which involve bonding or changing the properties of metals or other electrically-conductive materials. The process relies on induced electrical currents within the material to produce heat.

Typical Induction Heating System

An RF power supply sets alternating current within the coil, creating a magnetic field. Your workpiece is placed in the coil where this field induces eddy currents in the workpiece, generating precise, clean, non-contact heat in the workpiece.

Operating Frequency

The higher the frequency, the shallower the heating in the workpiece.

Magnetic vs. Non-Magnetic Materials

Due to hysteresis, magnetic materials are heated more readily than non-magnetic, resisting the alternating magnetic field within the induction coil.

Depth of Penetration

Induced current in the workpiece is most intense on the surface, diminishing below the surface; 80% of the heat produced in the part is produced in the outer 'skin'.

Coupling Efficiency

The relationship of the current flow in the workpiece and the distance between the workpiece and the coil is key; 'close' coupling increases the flow of current, increasing the amount of heat produced in the workpiece.

The Importance of Coil Design

The size and shape of the water-cooled copper coil must follow the shape of your workpiece and the variables of your process. The correct heat pattern maximizes the efficiency of heating.

Applied Power

System output determines the relative speed at which the workpiece is heated (a 5 kW system heating a workpiece more quickly than a 3 kW system)."

Now returning back to FIG. 8, an induction coil is wrapped around an RF permeable vessel 104 to ensure that the RF field generated from the induction coil can couple to either the electrically conductive cathode 112 and/or the electrically conductive anode nozzle 106 of the plasma arc torch 100. Hence, since the plasma arc torch 100 produces an electrical arc and subsequently plasma is formed near the arc, then the RF energy will couple to and enhance the plasma volume by first coupling to the free electrons within the arc. This allows for utilizing a much smaller DC power supply, for example a 12 volt battery and alternator in order to start an arc and ignite the plasma. Hence the DC power supply and arc are now operated as a plasma igniter. Thus, the RF energy is used to sustain the plasma while inertia from the whirling fluid confines the plasma. In addition, as previously disclosed, the vessel 104 has a tangential entry 110 and tangential discharge 118. The tangential discharge 118 via volute is crucial because it allows for throttling during operation to adjust plasma flow through the anode nozzle 106.

It will be understood that the vessel 104 may be constructed of an electrical conductor such as graphite, silicon carbide ("SiC"), tungsten carbide, tantalum or any high temperature electrically conductive material. Previous testing conducted by the inventor of the present invention showed that a SiC vessel could be heated to over 4,000° F. Consequently, since SiC is a very good infrared emitter, then EMR can be transmitted into the vessel by inductively heating the vessel with RF energy.

One unique, novel and completely unexpected feature is that the present invention operates similar to a diode and very similar to an electron gun. The DC power supply 130 sets up a potential difference between the cathode 112 and anode nozzle 106. Not being bound by theory, it is believed that a lower voltage DC power supply can be used, such as a vehicle alternator or battery, while maintaining a fairly large gap between the cathode 112 and anode 106. This is due to two phenomenon. First, if the cathode is heated with the induction coil, this will lead to thermionic emission. Second, it is well known that RF energy will couple to electrons. Hence, that is the method for plasma ignition within a standard IC plasma torch—provide a spark. Thus when the RF energy couples to the electron, the electron will gain energy. Consequently, this energy will be released when the electron strikes the anode. The anode will operate at a higher temperature, thus enhancing the plasma also.

Figure 9A:
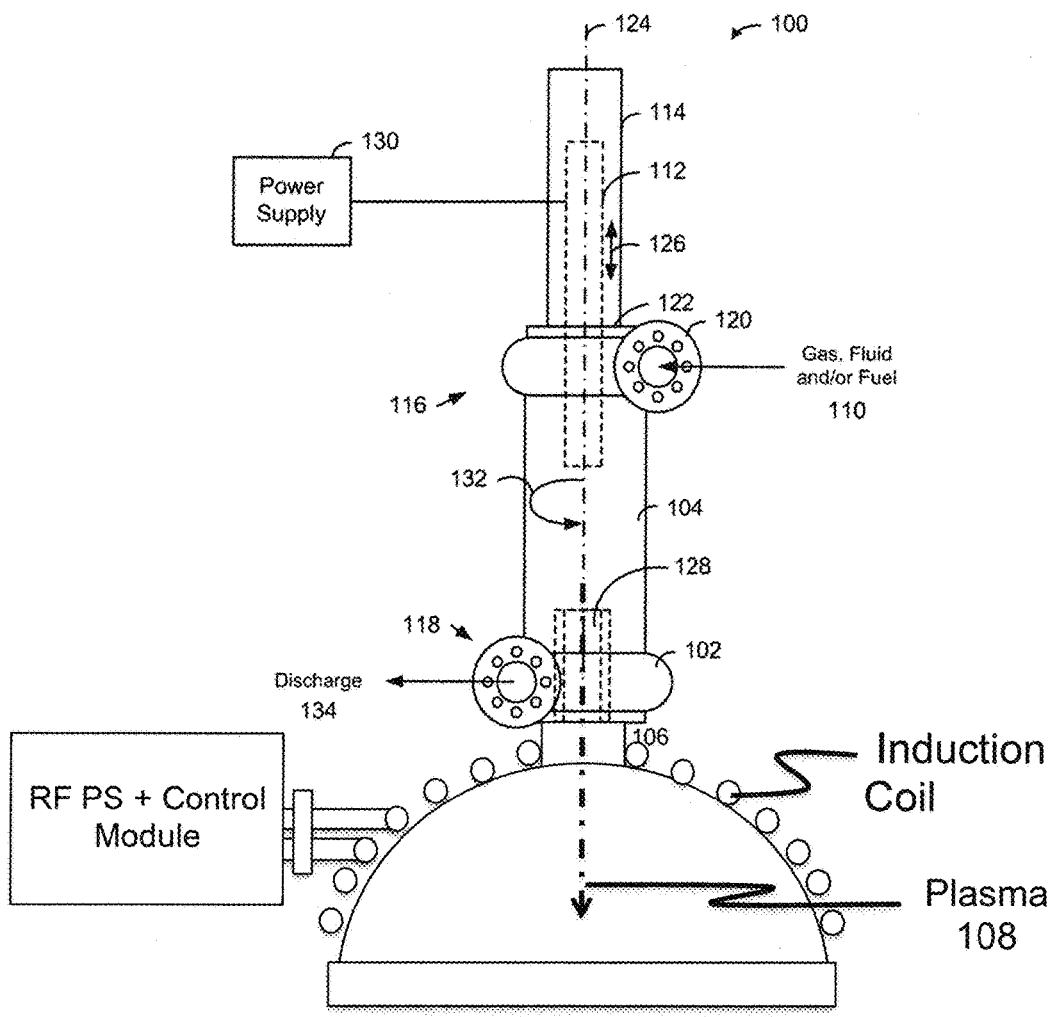
FIG. 9A is a diagram of a RF inductively coupled plasma arc torch in accordance with one embodiment of the present invention.
Figure 9B:
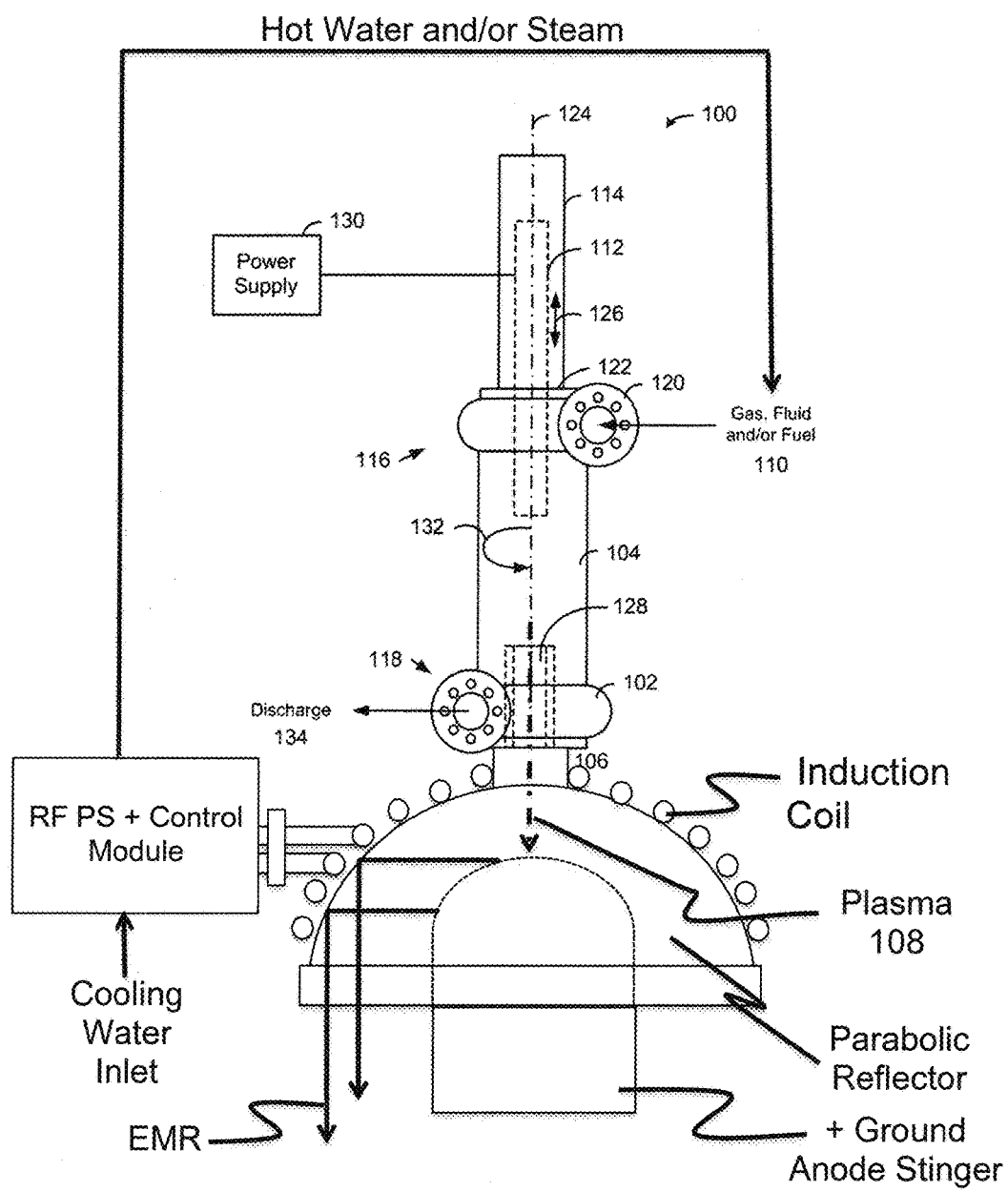
FIG. 9B is a diagram of a RF inductively coupled plasma arc torch in accordance with one embodiment of the present invention.

If electrons need to be pumped or further energized, then the RF coil can be wrapped around the plasma 108 exiting from the anode nozzle 106 as disclosed in FIGS. 9A-9B. In all tests with the plasma arc torch 100, when the discharge 134 was blocked or closed with a valve (not shown), the arc was blown out of the anode nozzle 106, then curled back around and attached to the anode nozzle 106. This phenomenon can be clearly observed when wearing a number 11 or higher welder's shield.

Now referring FIG. 9A, a diagram of a RF inductively coupled plasma arc torch in accordance with one embodiment of the present invention is shown. The induction coil is placed around an RF permeable parabolic reflector such as alumina. It is well known and well understood that alumina reflects EMR within the infrared frequency range. Consequently, the plasma 108 is enhanced with RF energy which in turn produces more EMR energy preferably in the UV, Visible and IR frequency range. The EMR energy is reflected downstream from the plasma 108 with the parabolic reflector thus enhancing the treatment of material. The RF coil can also be wrapped partially around the anode nozzle 106. This allows for RF coupling to the anode, free electrons exiting from the anode nozzle 106 and the plasma 108. It will be understood that several induction coils and RF power supplies can be placed downstream from the anode nozzle to increase total power of the system.

Referring now to FIG. 9B, a diagram of a RF inductively coupled plasma arc torch in accordance with one embodiment of the present invention is shown. A ground stinger electrode is used to transfer the arc from the cathode 112 to the anode nozzle 106 and then to the ground stinger electrode. RF energy from the induction coil may couple to the plasma, to the arc and/or to the ground electrode based upon operating frequency chosen for the desired application. Thus, the plasma arc torch 100 is the ignition source, while the RF energy is used to sustain the plasma. Hence, by using a ground stinger electrode this helps to confine the plasma near the electrodes and away from alumina reflector. By embedding the induction coil (not shown) within the alumina, this allows for cooling the alumina reflector. The hot water exiting from the alumina reflector may be used as the plasma gas. Thus, this allows for recuperating heat from hot water produced from the alumina reflector/recuperator. The hotwater and/or steam mixture is flowed into the plasma arc torch and is used as the gas/fluid 110 for the plasma arc torch 100.

Now returning back to FIGS. 6 and 7, both devices illustrate a vessel with a parabolic end shape. It will be understood that an induction coil may be attached to the plasma arc thermal oxidizer of FIG. 6 and/or the parabolic recuperator as shown in FIG. 7's plasma turbine air breathing and steam rocket.

Figure 10:
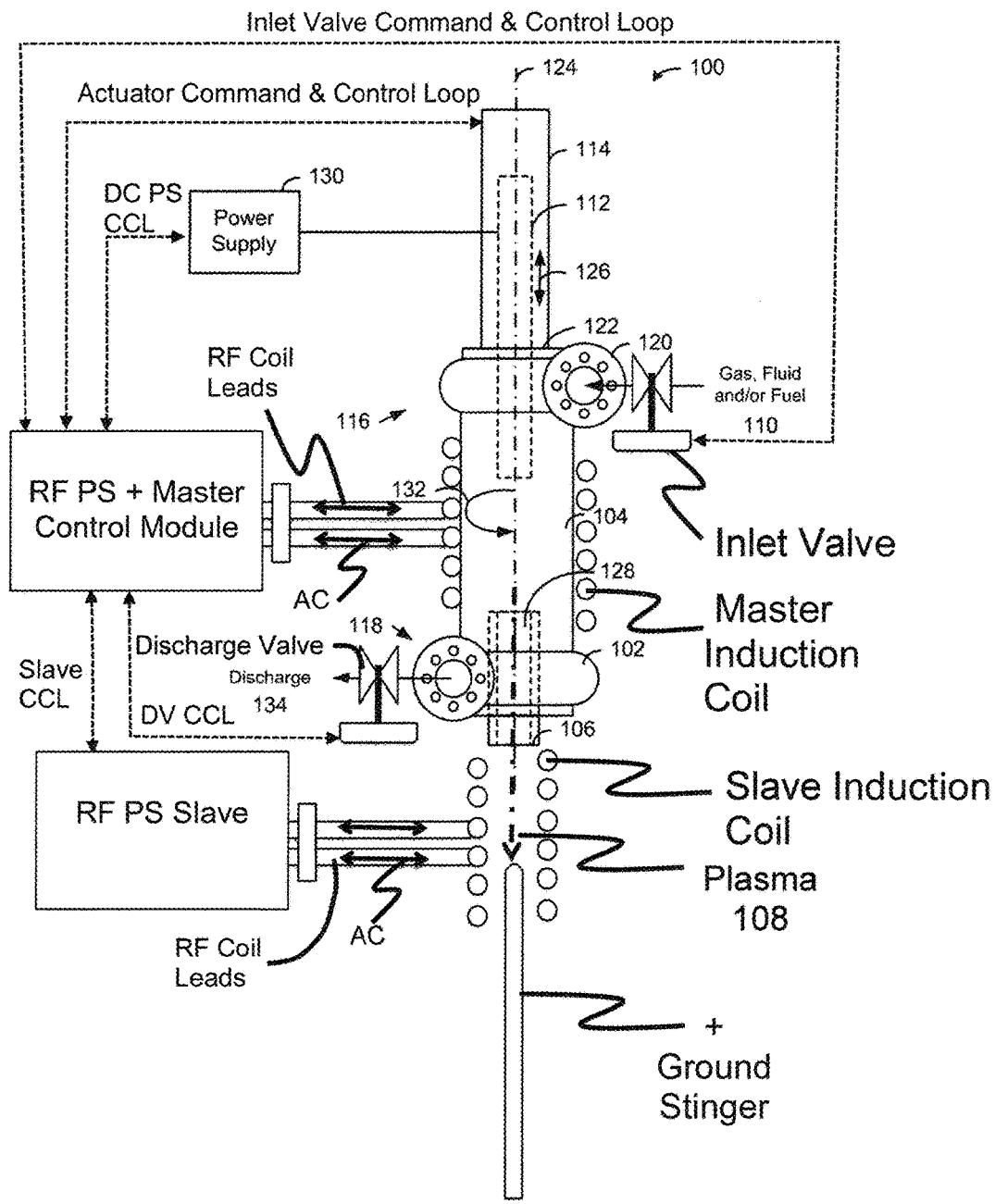
FIG. 10 is a diagram of a master and slave RF inductively coupled plasma arc torch in accordance with one embodiment of the present invention.

Turning now to FIG. 10, a diagram of a master and slave RF inductively coupled plasma arc torch in accordance with one embodiment of the present invention is shown in which RF power supplies are stacked to increase total power rating of the system. The induction coils may operate at the same frequency or at different frequencies based upon the coupling material—electrode, plasma or free electrons. Consequently, this allows for maximizing energy into the system by increasing coupling efficiency. The system includes control loops as shown in order to control an inlet valve, an outlet valve, the linear actuator, the DC power supply 130, the RF Power Supply Master Control Module and the RF Power Supply Slave.

Figure 11:
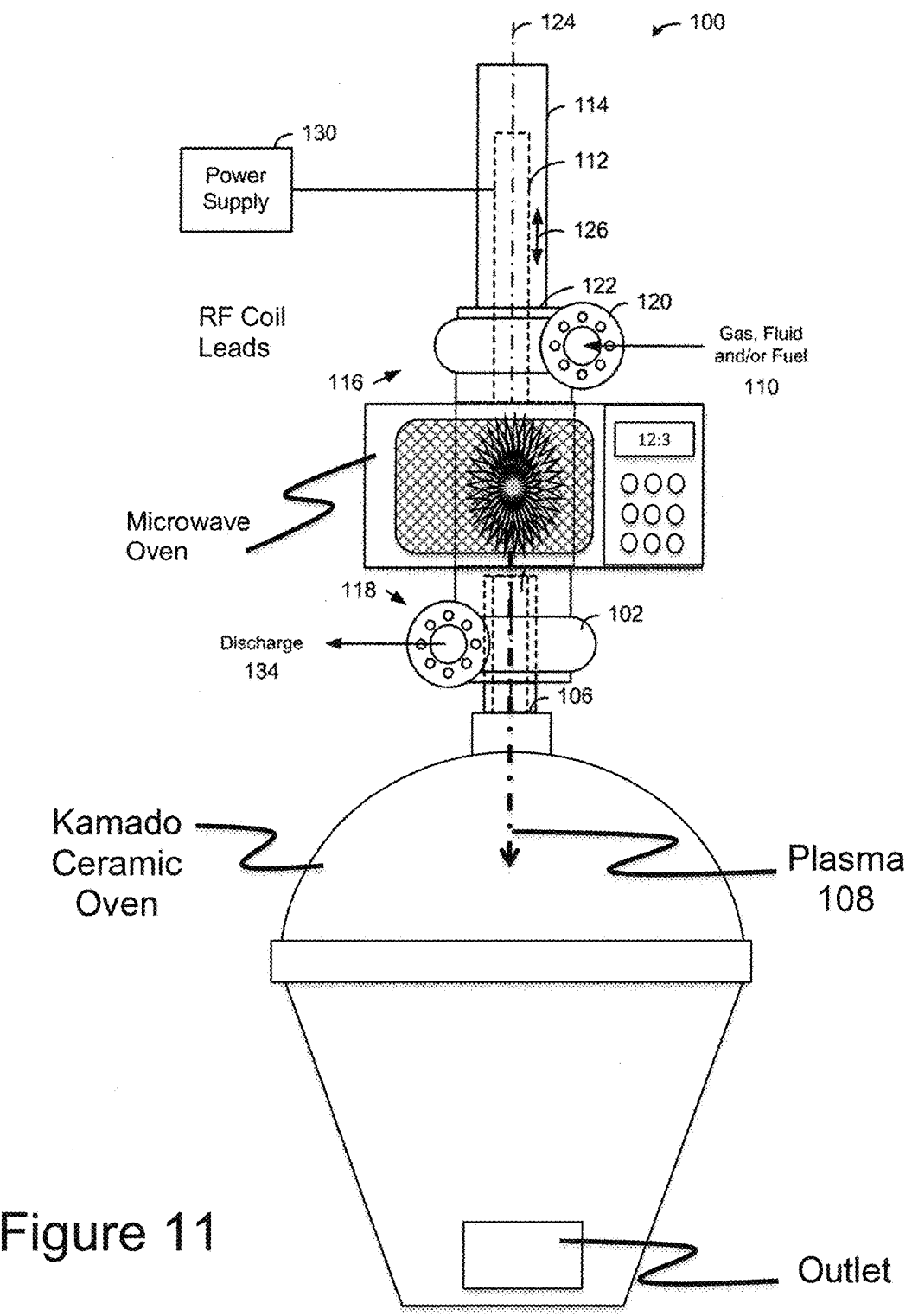
FIG. 11 is a diagram of a microwave inductively coupled plasma arc torch in accordance with one embodiment of the present invention.

The simplicity of the present invention is illustrated in FIG. 11, which is a diagram of a microwave inductively coupled plasma arc torch in accordance with one embodiment of the present invention. The plasma arc torch 100 is partially placed within a microwave oven, by first drilling a hole through the top and bottom of the microwave oven. A microwave permeable material such as quartz glass, alumina and/or sapphire is used as the vessel 104. Volutes 116 and 118 are reattached to the vessel 104 on the exterior top and bottom of the microwave oven. It will be understood that the anode nozzle 106 and tangential discharge 134 may be located on the top of the microwave oven in order to keep hot gases flowing upwards. The orientation of the plasma arc torch 100 is based upon its use. For example, by utilizing the orientation in the current configuration a unique downdraft plasma gasifier can be constructed by simply using an ancient clay cooker called a "kamado." Big Green Eggs® and generic kamado clay cooker are commonly available in stores.

Returning to FIG. 11, anode nozzle 106 would be attached to the top of the kamado clay cooker's exhaust. Metal screens supplied with the kamado would be removed or can be used to support biomass. Biomass or garbage would be placed inside the kamado by simply lifting the lid. Syngas would be piped from the bottom outlet of the kamado. Likewise, the device as disclosed in FIG. 11 can be attached to the bottom outlet of the kamado and operated as an updraft gasifier.

Another unique feature of the present invention is that natural gas or propane and water can be used as the plasma gas. A water mister would be attached to the inlet line of the propane 110 feeding into inlet 120. Thus, the propane would be steam reformed and the hot syngas plasma would gasify any biomass within the kamado. However, a small steam generator can be built by simply coiling copper tubing and using it to cool the syngas. The water will be converted to steam and is used as the fluid 110 in the inductively coupled plasma arc torch 100. The DC power supply can be a battery, small DC welder or an alternator turned by a gas type engine fired on the syngas produced from the Kamado IC Plasma Arc System.

Figure 12:
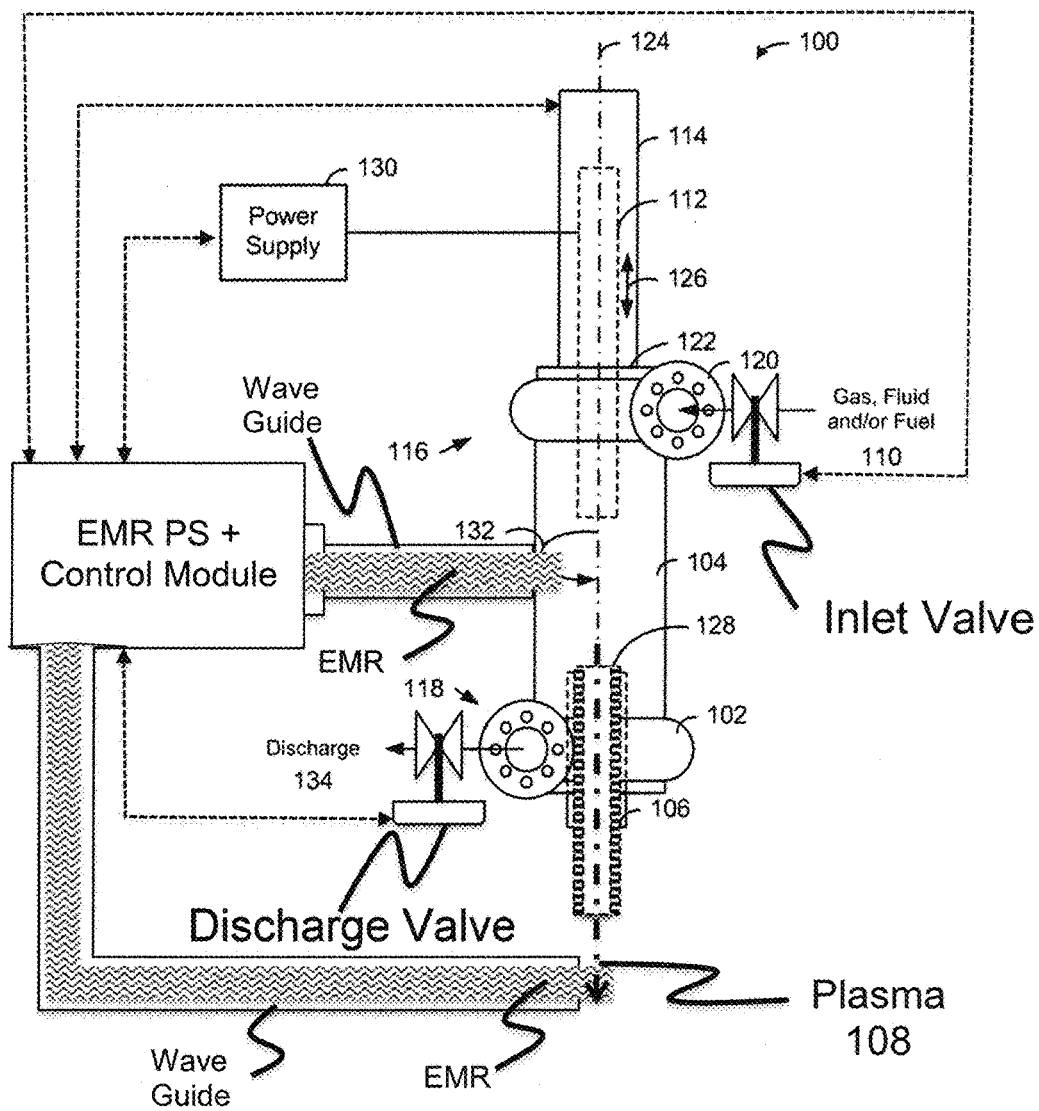
FIG. 12 is a diagram of a master and slave microwave inductively coupled plasma arc torch in accordance with one embodiment of the present invention.

Now referring to FIG. 12, a diagram of a master and slave microwave inductively coupled plasma arc torch in accordance with one embodiment of the present invention is shown. For commercial and industrial applications, the plasma arc torch 100 is improved by coupling with microwaves. A waveguide is attached to the vessel 104 in order to emit EMR into the plasma arc torch 100. It is well known that EMR within the microwave frequency range will couple to graphite, electrons and plasma. The plasma arc torch 100 may include another waveguide for irradiating the plasma 108 and free electrons exiting from the anode nozzle 106.

Figure 13:
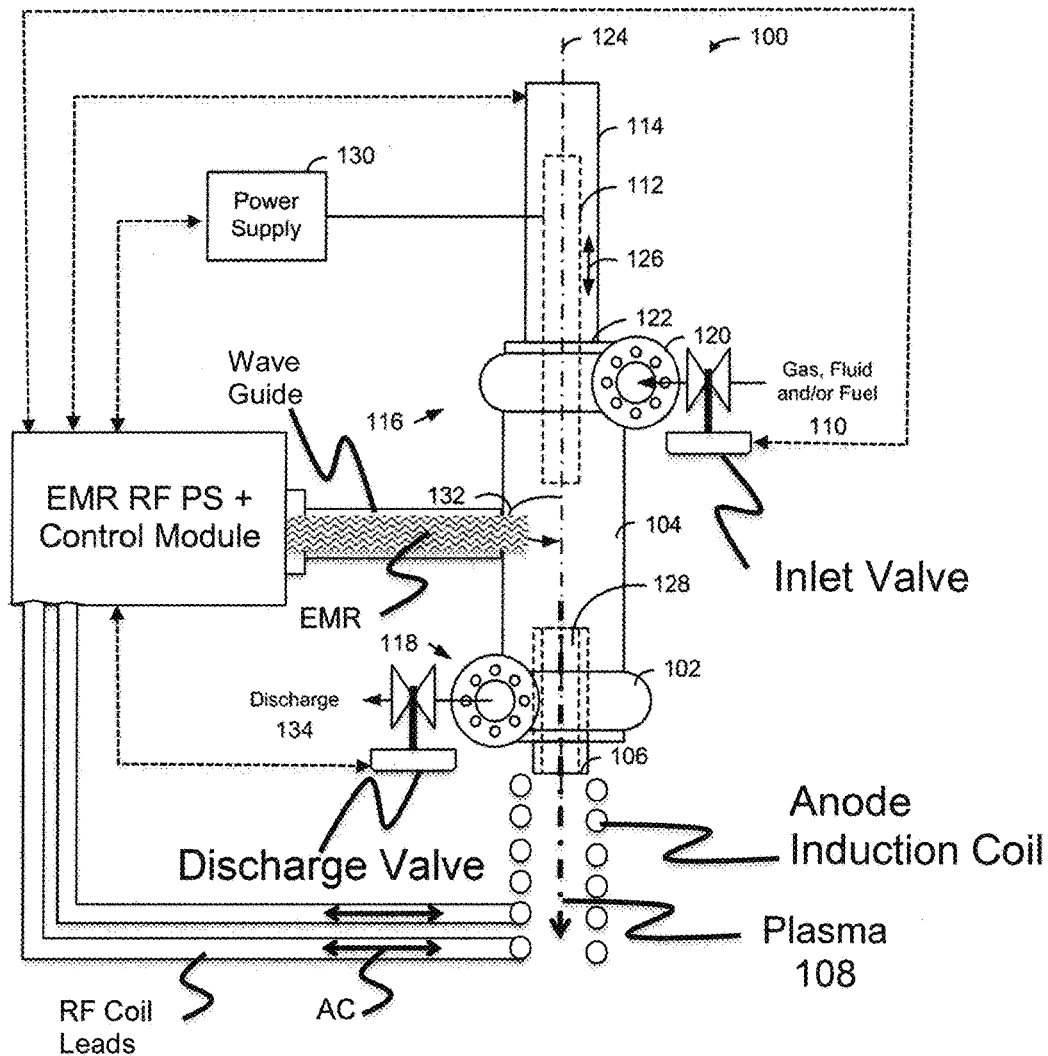
FIG. 13 is a diagram of a dual frequency inductively coupled plasma arc torch in accordance with one embodiment of the present invention.

Referring now to FIG. 13, a diagram of a dual frequency inductively coupled plasma arc torch in accordance with one embodiment of the present invention is shown. EMR at a higher frequency, such as microwave frequency range from 900 MHz to 2.45 GHz, is used to sustain the plasma 108 and energize free electrons while a second EMR source at a different frequency, such as 10 to 400 KHz is used to inductively couple to the anode nozzle 106, plasma 108 or free electrons. Likewise, line frequency of 50 or 60 Hz may be used by simply wrapping an electrical line around the plasma arc torch 100 vessel 104 and/or the anode nozzle 106.

Figure 14:
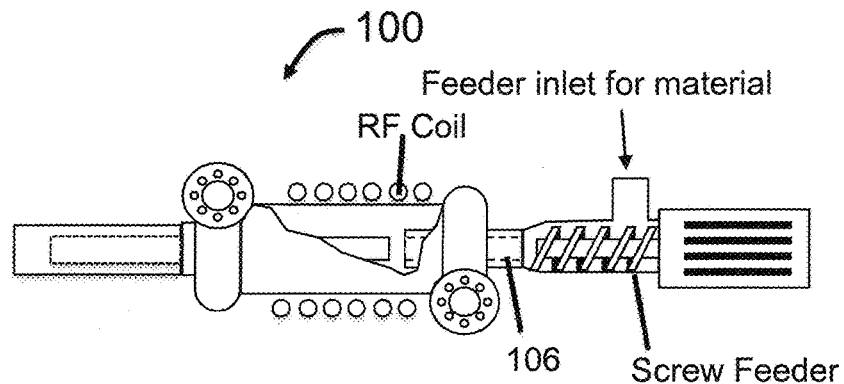
FIG. 14 is a diagram of an inductively coupled plasma arc torch screw feeder in accordance with one embodiment of the present invention.

Now referring to FIG. 14, a diagram of an inductively coupled plasma arc torch screw feeder in accordance with one embodiment of the present invention is shown. As previously stated the plasma arc torch is in itself is a plasma reactor. The present invention shown in FIG. 14 has been built, tested and found to produce unexpected results.

Several different types of biomass were fed through the hollow anode 106. The screw feeder stopped feeding material. The system was disassembled and a carbon ball was found within the anode nozzle 106. The carbon ball had no odor and when crushed a white material was found within the center. It is believed that minerals such as calcium were concentrated in the center. It will be understood that any material can be backflowed through the anode nozzle. The plasma arc torch 100 can be dramatically enhanced with an induction coil. The RF energy will couple to the graphite nozzle, thus heating it to assist in carbonization of feedstock. Likewise, a frequency can be chosen to couple to the arc and/or the plasma.

Now turning back to FIG. 1, the discharge 134 is necessary in order to operate in this configuration. All other plasma torches are designed to produce a plasma and discharge the plasma from a nozzle. The improved IC plasma arc torch 100 as disclosed in FIG. 14 allows for a very simple design for a gasifier, gas cracker, furnace and/or pyrolysis system.

Figure 15:
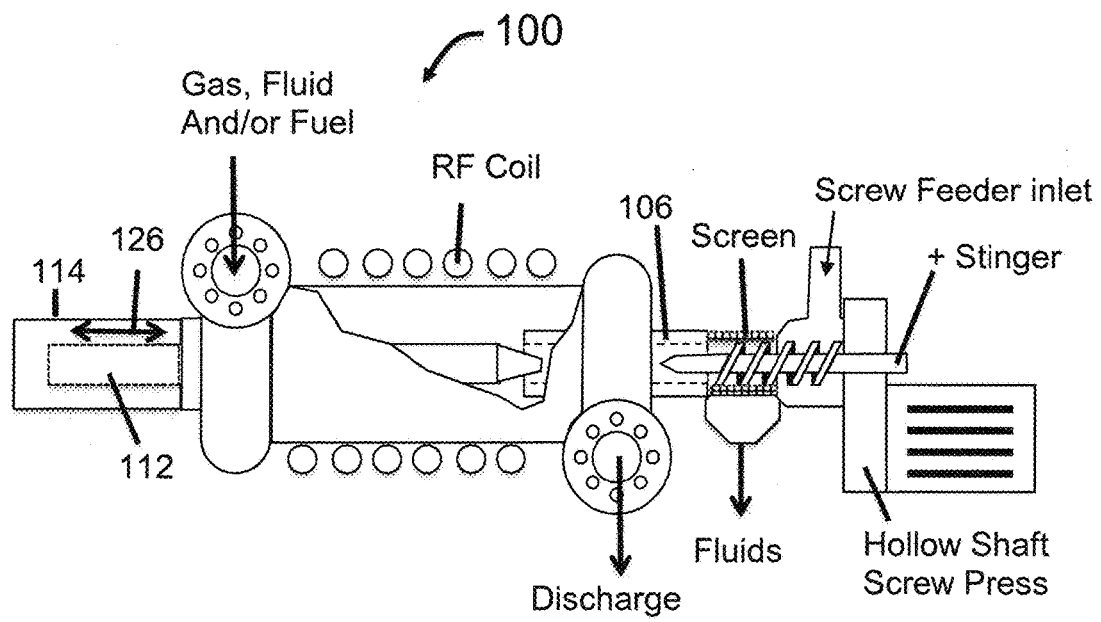
FIG. 15 is a diagram of an inductively coupled plasma arc torch screw press in accordance with one embodiment of the present invention.

Referring now to FIG. 15, a diagram of an inductively coupled plasma arc torch screw press in accordance with one embodiment of the present invention is shown. The novelty of the present invention's linear actuator electrode can be fully appreciated when operated with a screw press. Screw presses typically use an actuator to hold back the solids in order to squeeze and press the liquids from the solids. The linear actuator coupled to the cathode electrode 112 is used to maintain pressure against material within the hollow anode nozzle 106. A hollow shaft screw further improves the system by inserting a positive grounded stinger down the bore of the hollow shaft. This allows for feeding both electrodes from opposite ends, thus overcoming the number one problem with plasma torches—electrode life. Hence, by continually feeding graphite electrodes, the system does not need to be shut down. Graphite electrodes with boxes and pins that screw together are very common and are used throughout the metal industry in carbon arc furnaces as well as for carbon arc gouging.

The device shown in FIG. 15 allows for dewatering solids while simultaneously treating the solids with high temperature plasma. The induction coil allows for induction heating of the anode nozzle 106 the cathode electrode 112 as well as coupling to the plasma and the arc. Where DC power and the arc come into play is when material begins to carbonize it then becomes electrically conductive. However, at the onsite of carbonization the material will act as a resistor. Thus, the material can be efficiently heated with resistive heating via DC power. The gas, fluid and/or fuel 110 utilized is based upon the desired output for example quenching the hot carbon balls with water. Likewise, this configuration allows for scrubbing any gases produced by using an alkaline solution.

Figure 16:
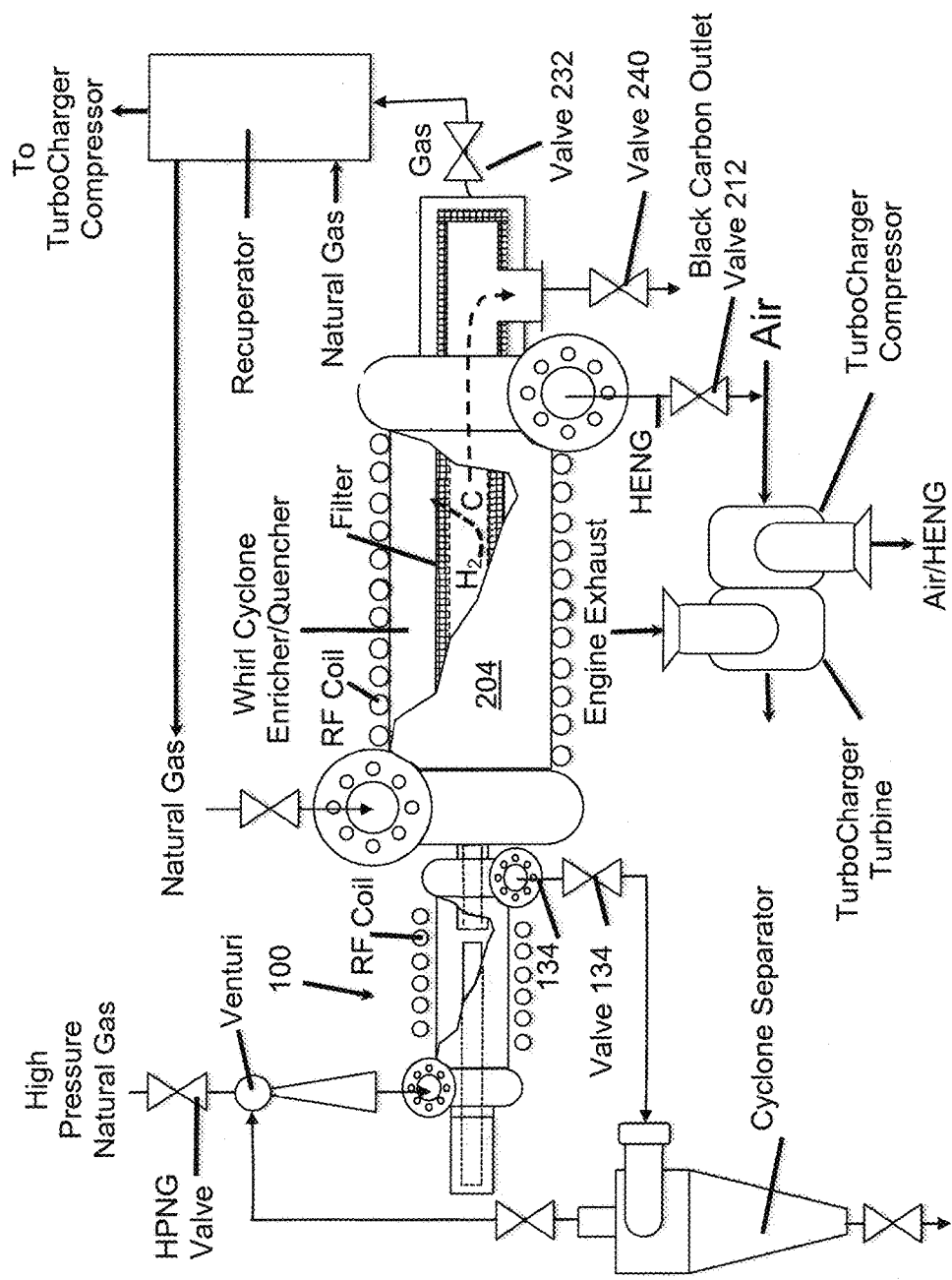
FIG. 16 is a diagram of an inductively coupled plasma arc torch hydrogen enrichment system in accordance with one embodiment of the present invention.

Referring to FIG. 16, an inductively coupled plasma ArcWhirl® torch cracker is disclosed in another embodiment of the present invention. In lieu of adding air to the Whirl/Vortex Combustor as disclosed in FIGS. 2, 3, 4, 5 and 6, natural gas ("NG") or any quenching fluid is flowed into the whirl combustor. In order to be brief, NG will be used as an example for the quench fluid. NG is flowed into the plasma arc torch 100 to begin cracking NG, ethane, butane or propane into hydrogen and black carbon. Since hydrogen is less dense then carbon it will seek the center of the whirling cyclone within the plasma arc torch 100. Consequently, black carbon being more dense will be forced to the outside or periphery wall of the whirling cyclone within the plasma arc torch 100.

Another novel feature of the present invention lies in part of the whirling black carbon near the vessel 204 wall. The EMR from the induction coil will couple to the black carbon and inductively heat the black carbon. This will ensure that any and all volatile material will be volatilized, thus producing a fairly clean black carbon. Furthermore, the addition of the Induction Coil allows for cofeeding biomass, coal, coke or any carbonaceous material with a fluid directly into plasma arc torch 100 with a venturi.

Since a cyclone separator is not a perfect separator some carbon will be entrained within the hydrogen and flow through the electrode nozzle. Hence the high temperature filter attached to the electrode nozzle. The filter traps the carbon ("C") and only allows hydrogen ("$H_2$") to pass through it as shown by arrows $H_2$ and C. Thus, by coupling the Whirl/Vortex Enricher/Quencher to a very novel inductively coupled plasma arc torch cracker the amount of hydrogen produced and flowed can be easily controlled for hydrogen enriching any fuel.

By throttling valve HPNG and valve 134 hydrogen production and NG recirculation dictates how much hydrogen flows through the electrode nozzle and into the Whirl/Vortex Enricher. For example, shutting valve HPNG eliminates hydrogen production. Fully opening valve HPNG and shutting valve 134 maximizes hydrogen production. However, carbon will be entrained with the hydrogen and removed via the filter. In order to operate in a preferred carbon capture mode, valve HPNG is throttled to produce a vacuum within the venturi. The venturi pulls a suction on a cyclone separator. Valve 134 is throttled to allow carbon, uncracked NG and some hydrogen into the cyclone separator. Carbon is removed and uncracked NG and hydrogen are recycled via the venturi.

The hydrogen and some carbon enter into the Whirl/Vortex Enricher/Quencher. Only hydrogen passes through the filter. An ideal porous material for the filter is carbon foam manufactured by CFOAM. CFOAM is electrically conductive but not thermally conductive. It is a good thermal insulator. Hence, it will aid in trapping the heat to ensure that NG within the filter is further cracked to hydrogen and carbon.

When the hydrogen permeates through the porous filter media, it quickly mixes with the NG whirling within the Enricher. Likewise, the cool NG quickly quenches and absorbs the heat from the hot hydrogen gas.

The Hydrogen Enriched Natural Gas ("HENG") exits the Whirl Enricher and flows into a centrifugal compressor of a turbocharger or turbocompressor. It may or may not be entrained with air for premixing prior to combustion. Although not shown, a plasma arc lean combustion turbine operating on hydrogen may be used to drive the turbine of the turbocharger.

The valves 212 and 232 as disclosed in FIG. 2 allow for the plasma arc cracker to be cleaned online by simply shutting valve 212 and opening valve 232. Referring to both FIGS. 2 and 16, NG will flow from outside to inside the filter and the mixture of hydrogen and natural gas will flow through valve 232 while carbon will exit through valve 240. The gas mixture then flows into a recuperator then the compressor of the turbocharger. Thus, the filter is cleaned while still producing hydrogen and enriching natural gas or any other fuel. Now, by adding an induction coil around the whirl cyclone enricher and quencher it enhances the performance of the system by ensuring the filter is operated at a high temperature, by also allows for preheating any fluid backflowed through the filter for cleaning purposes. Air, oxygen or steam may be backflowed to remove the carbon trapped within the porous spaces of the filter.

Figure 17:
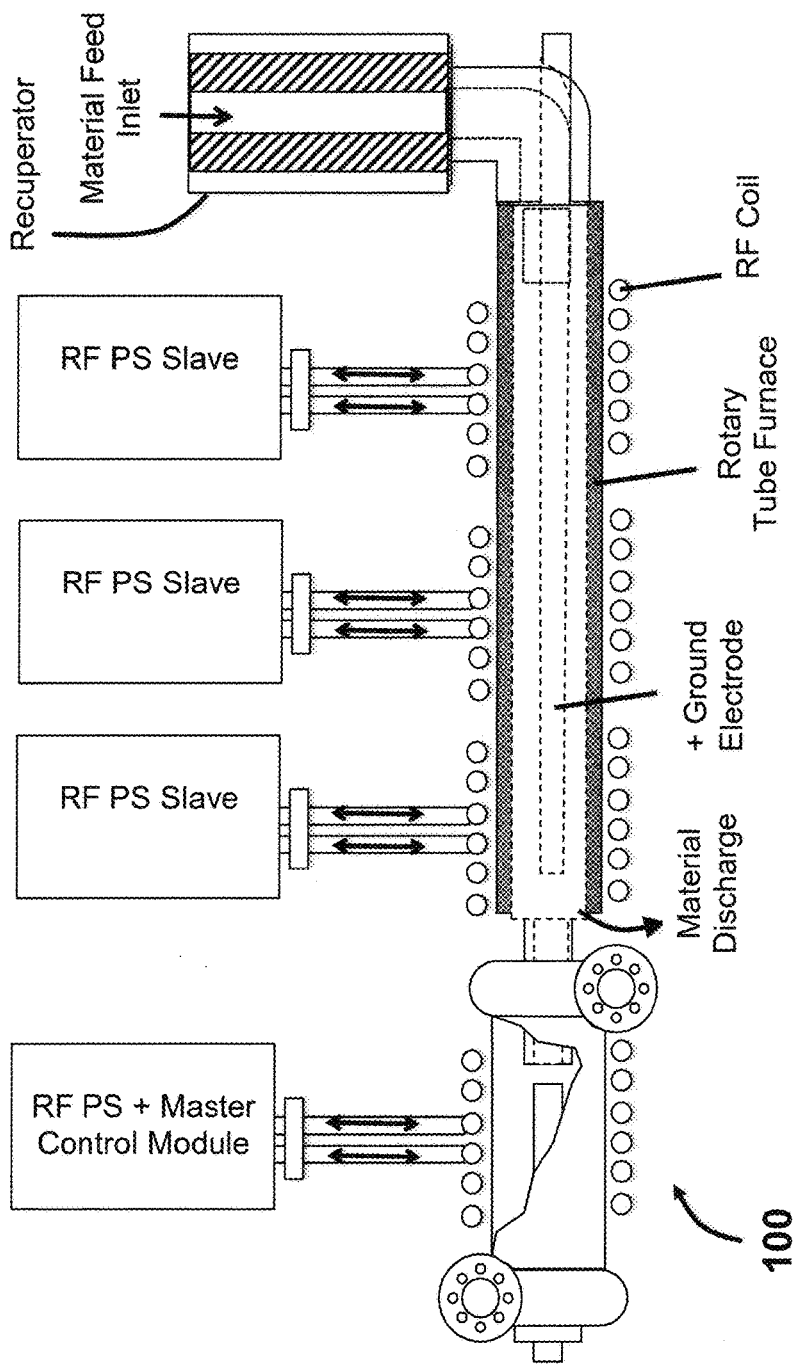
FIG. 17 is a diagram of an inductively coupled plasma arc torch rotary tube furnace in accordance with one embodiment of the present invention.

Now referring to FIG. 17, a diagram of an inductively coupled plasma arc torch rotary tube furnace in accordance with one embodiment of the present invention is shown. The inductively coupled plasma arc torch 100 is directly attached to discharge its plasma into an induction rotary tube furnace with induction coils located on the periphery of the tube. The rotary furnace tube may be selected from an RF permeable (quartz, sapphire, alumina) or RF absorbing material (graphite, silicon carbide, tungsten carbide, molybdenum, stainless steel, Kanthal®, tantalum, etc.). For example, if the furnace tube is graphite, then temperatures in excess of 5,000° F. can be reached and maintained within the rotary graphite furnace via induction heating of the rotary graphite tube. In this mode of operation a fuel gas would be used that can be cracked to hydrogen and black carbon in order to operate in an inert atmosphere. However, any inert gas may be used and recycled. A recuperator allows for preheating material while also allowing for preheating the gas to used in plasma arc torch 100. An ideal use for the aforementioned inductively coupled plasma ArcWhirl® rotary furnace tube is for manufacturing and sintering proppants.

Proppants are used to fracture oil and gas wells. Currently, proppants are sintered with long rotary kilns fired with natural gas. There are many problems associated with long rotary kilns, however the number one issue is relining the kiln with refractory. Another major issue is that proppants must be fired at 2,900° F. Thus, at this temperature, NOx emissions are a problem for rotary kilns. The IC Plasma Arc Rotary Graphite Furnace Tube allows for sintering proppants in an inert atmosphere, thus allowing for higher firing temperatures, shorter residence times and zero emissions by recycling an inert gas.

On the other hand, the IC Plasma Arc Rotary Furnace may be operated in an oxidizing atmosphere. For example, if the rotary tube is made of alumina, then RF energy will inductively heat the positive ground electrode, the arc and the plasma within the rotary tube. In this mode of operation air or oxygen can be used as the plasma gas.

As previously disclosed several RF power supplies ("PS") can be stacked in order to increase total power of the system. One PS would operate as the master while the others would operate as slaves. Likewise, as previously disclosed, utilizing a stinger electrode allows for feeding electrodes from both ends for continuous duty operations.

Figure 18:
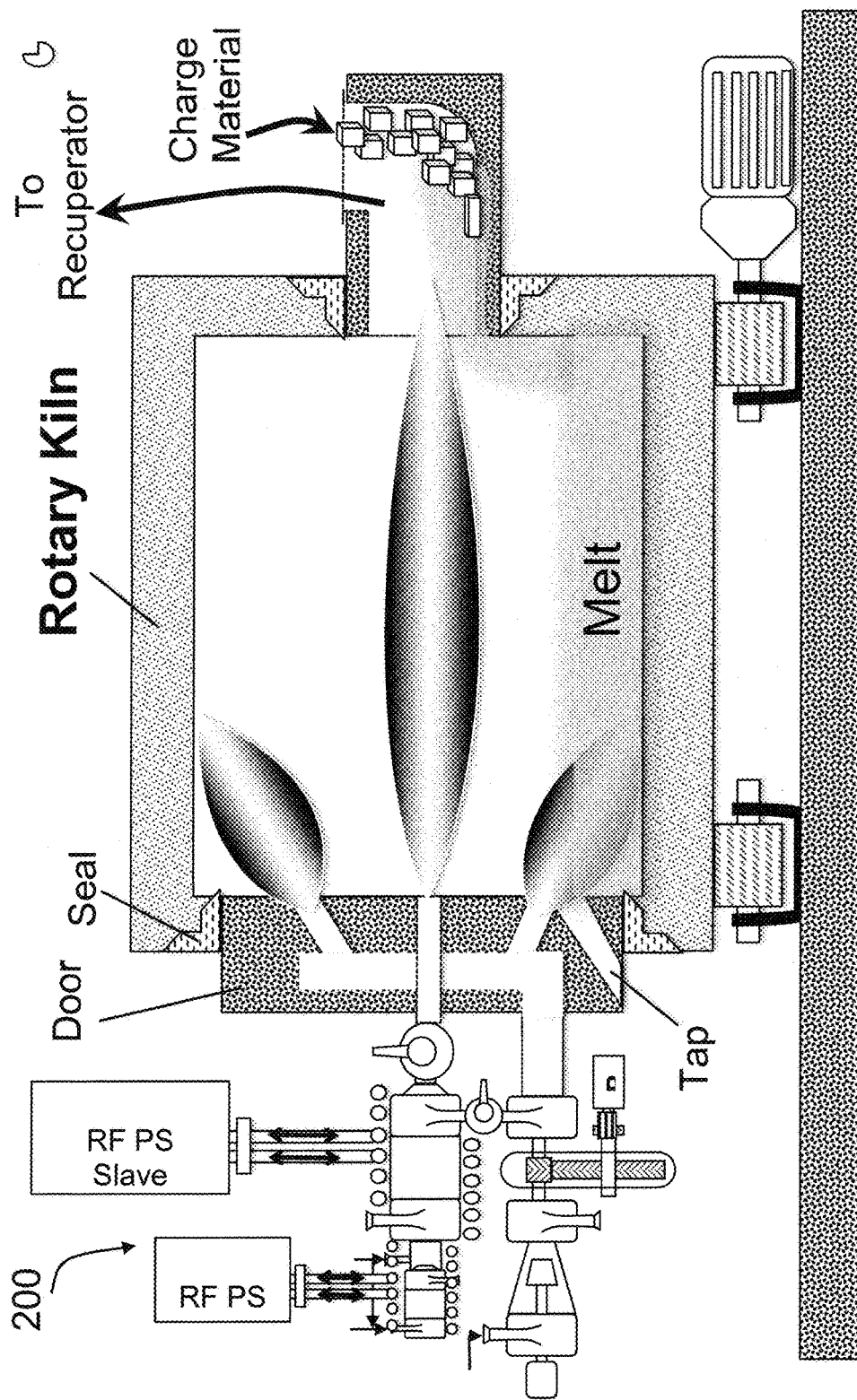
FIG. 18 is a diagram of an inductively coupled plasma arc torch rotary kiln in accordance with one embodiment of the present.

Referring now to FIG. 18, a diagram of an inductively coupled plasma arc torch rotary kiln in accordance with one embodiment of the present invention is shown. The plasma arc turbine torch 200 may be attached to any rotary kiln. The plasma arc torch 100 is easily retrofitted into an inductively coupled plasma torch by adding RF coils. By attaching the present invention to a rotary kiln and by first lean and/or rich combusting a fuel and/or gasifying biomass, the hot combustion gases can drive a turbogenerator as previously disclosed. This in turn provides the electrical power to the DC and RF power supplies. Thus, facilities operating in areas that have high electrical costs can operate off the grid by using a hydrocarbon fuel or renewable fuels such as biomass, wind or solar. Likewise, since it is well known that exhaust gas temperatures from modern day turbochargers can reach 1,800° F., then the hot exhaust from the turbine is piped into the rotary furnace door is shown. The central exhaust nozzle fired directly down the center of the rotary kiln. The turbine exhaust is directed tangentially down and up by to form yet another WHIRLING hot gas. The melt is tapped via a tap hole. Hot gases exit to a recuperator (not shown) to preheat combustion air. Charge material is fed on the opposite end of the rotary kiln. This system would be ideal for recovering aluminum from aluminum dross, aluminum cans and Tetra Pack® fluid containers.

Figure 19A:
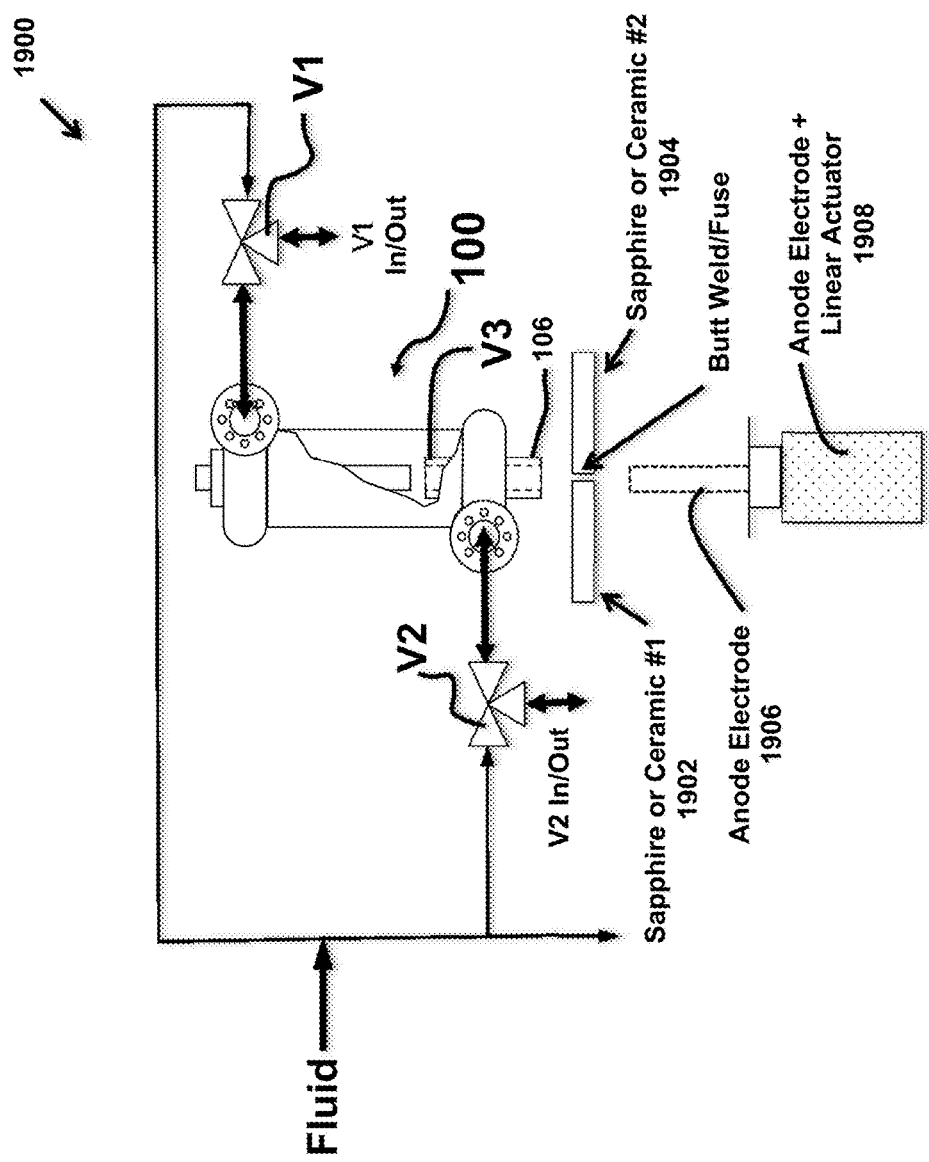
FIGS. 19A-19B are diagrams of a plasma arc welder in accordance with one embodiment of the present invention.
Figure 19B:
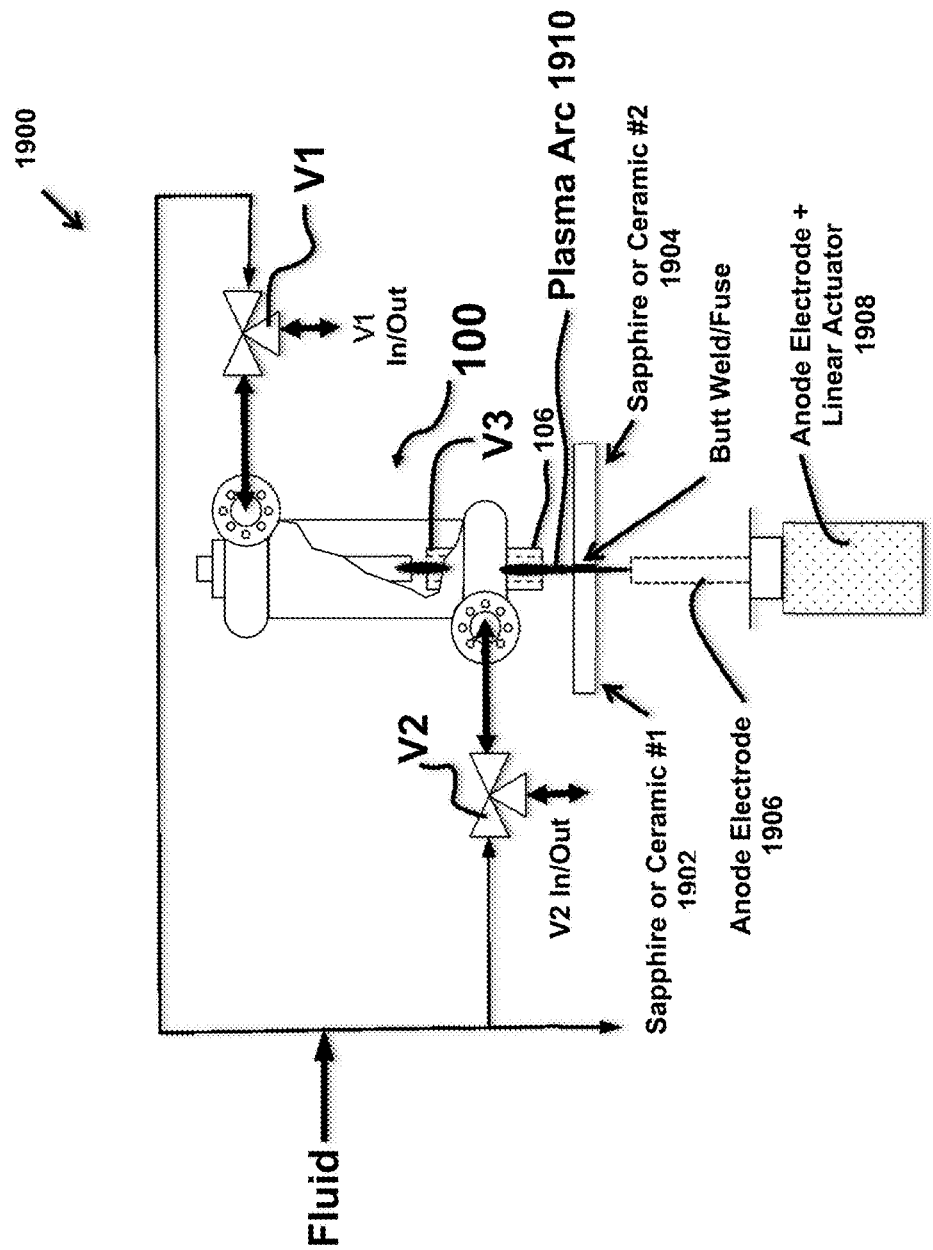
Figure 25:
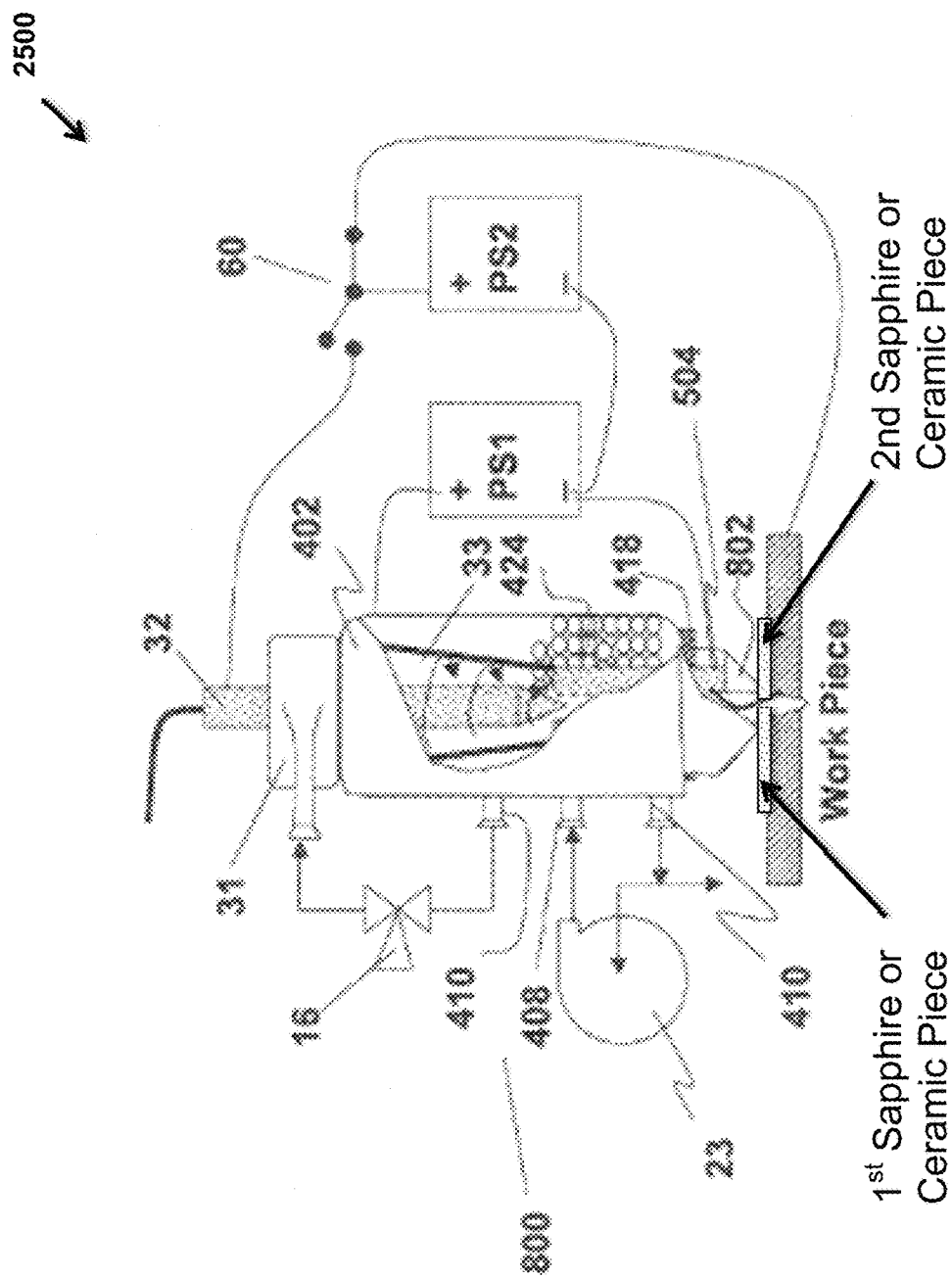
FIG. 25 is a diagram of an inductively coupled plasma arc welder in accordance with one embodiment of the present invention.

FIGS. 19A-B to 25 will now be described. A device for plasma arc welding at least two ceramic or sapphire pieces together include a cylindrical vessel having a first end and a second end, a tangential inlet connected to or proximate to the first end, and a tangential outlet connected to or proximate to the second end. An electrode housing is connected to the first end of the cylindrical vessel such that a first electrode is (a) aligned with a longitudinal axis of the cylindrical vessel, and (b) extends into the cylindrical vessel. A hollow electrode nozzle is connected to the second end of the cylindrical vessel such that the center line of the hollow electrode nozzle is aligned with the longitudinal axis of the cylindrical vessel. A second electrode positioned proximate to the hollow electrode nozzle such that the ceramic or sapphire is positioned between the second electrode and the hollow electrode. The tangential inlet and the tangential outlet create a vortex within the cylindrical vessel, and the first electrode and the hollow electrode nozzle create a plasma that discharges through the hollow electrode nozzle and couples to the second electrode such that the two pieces of ceramic or sapphire are welded together.

Referring now to FIGS. 19A-B, diagrams are shown of a plasma arc welder 1900 for welding ceramics, such as sapphire, utilizing the plasma arc welding method. A first sapphire or ceramic piece 1902 and a second sapphire or ceramic piece 1904 are positioned next to the anode nozzle 106 of the plasma torch 100. Although the plasma torch 100 can be operated in a non-transferred arc mode, to ensure full penetration via key hole welding a second or backing anode electrode 1906 with a linear actuator 1908 is located opposed to the anode nozzle 106 in order to transfer the arc 1910 as shown in FIG. 19B.

The second or backing anode electrode 1906 with the linear actuator 1908 serve three purposes. First, they allow the plasma torch 100 to be operated in a transferred arc mode for confining and restricting the arc 1910. This allows for full penetration to ensure that the first sapphire or ceramic piece 1902 and the second sapphire or ceramic piece 1904 are fully welded via keyhole welding. Second, the second or backing anode electrode 1906 serves as a welding backing material. This allows for producing a smooth and coalesced weld between the sapphire pieces. Third, the second or backing anode electrode 1906 with the linear actuator 1908 can move and traverse in the same motion and direction as the plasma torch 100 thus allowing for producing intricate sapphire or ceramic shapes.

Figure 20:
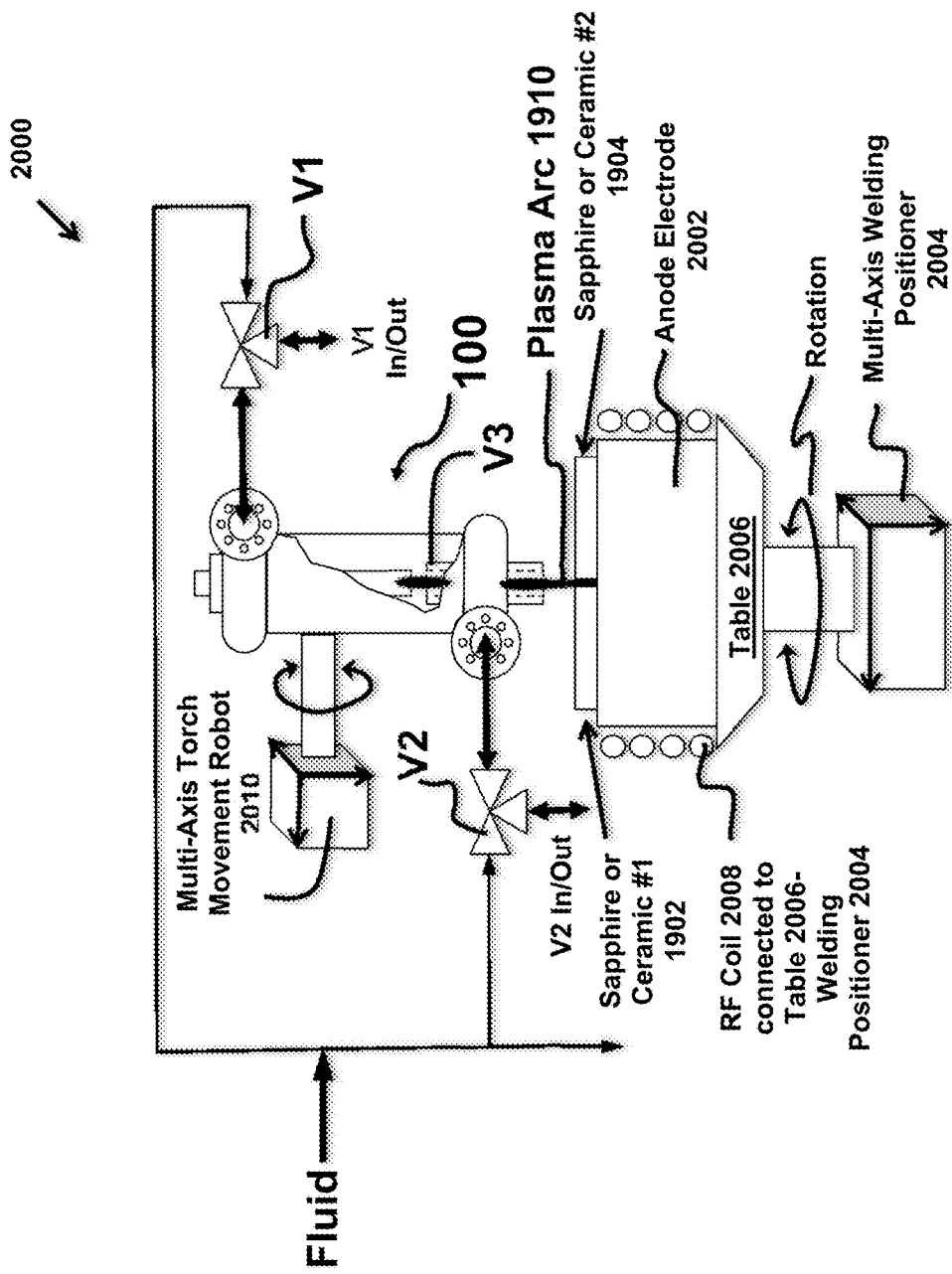
FIG. 20 is a diagram of a plasma arc welder in accordance with one embodiment of the present invention.

Turning now to FIG. 20, a diagram is shown of an inductively coupled plasma arc welder 2000 for welding ceramics and sapphire utilizing a novel plasma arc welding method synergistically coupled with an induction preheating and post weld treating method. second or backing anode electrode 1906 with the linear actuator 1908 of FIGS. 19A-19B are replaced with a much larger electrode 2002 that is attached or connected to a multi-axis welding positioner 2004, typically via a rotatable table 2006. The electrode 2002 is surrounded by an induction coil 2008 that is used to heat the electrode 2002. Thus, this allows for preheating the sapphire or ceramic pieces to a temperature range from 500° C. to 2,000° C. and more specifically to a preheating temperature to assist in flash welding the first sapphire or ceramic piece 1902 and second sapphire or ceramic piece 1904 together. In addition, the system, method and apparatus shown in FIG. 20 allows for operating in a transferred arc mode by utilizing a welding positioner. It is well known and understood that electrical current can be flowed through a welding positioner. Consequently, and once again this configuration as shown in FIG. 20 allows for producing net shaped sapphire structures by attaching the plasma torch 100 to a multi-axis robot 2010.

Figure 21:
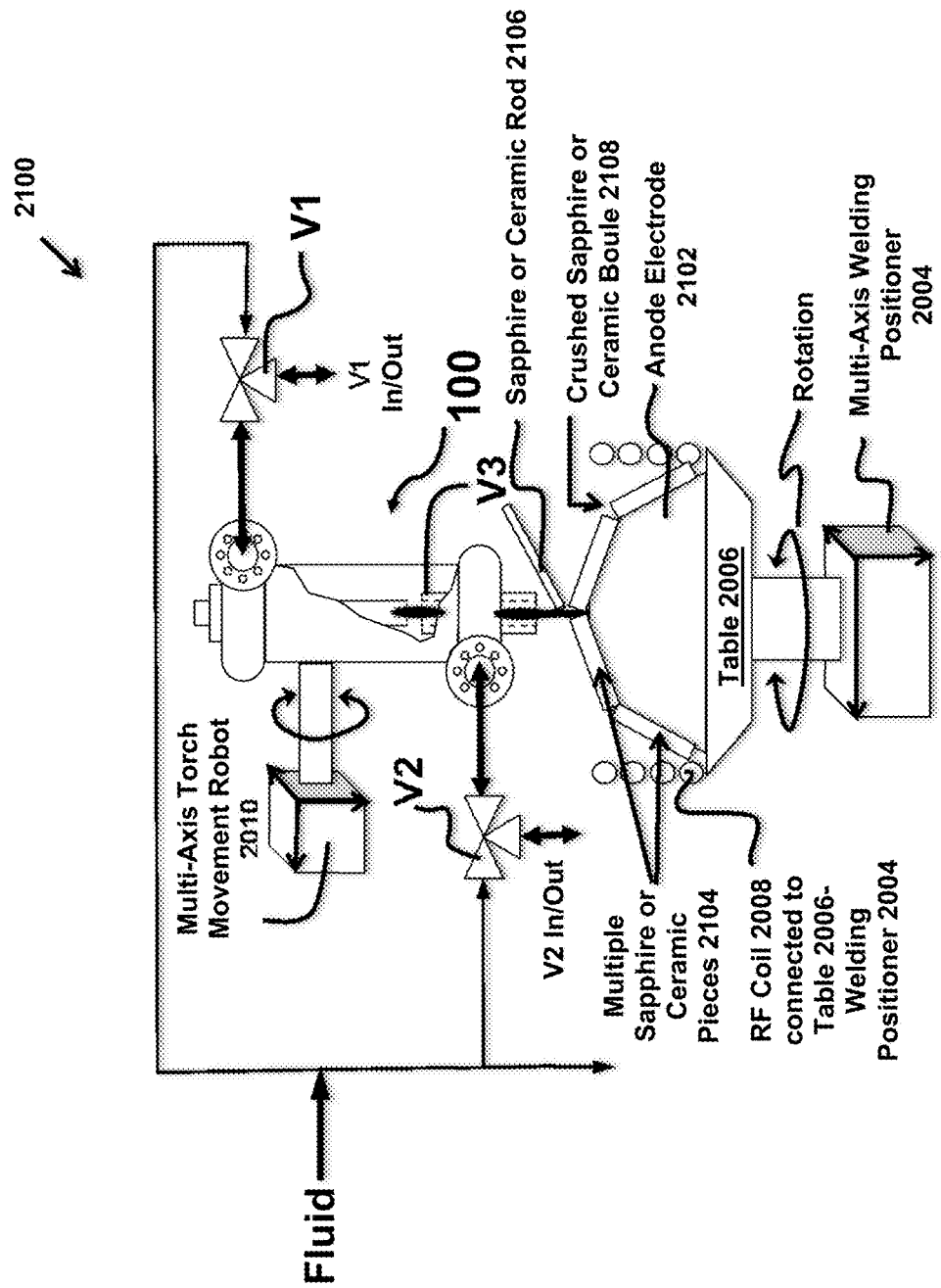
FIG. 21 is a diagram of an inductively coupled plasma arc welder in accordance with one embodiment of the present invention.

Turning now to FIG. 21, a diagram is shown of an inductively coupled plasma arc welder 2100 for welding ceramics or sapphire utilizing a novel plasma arc welding method synergistically coupled with an induction preheating and post weld treating method. For example, the electrode anode 2002 of FIG. 20 can be machined to act as a mold. Consequently, the sapphire (e.g., windows) or ceramic pieces 2104 would be laid flat against the machined surface of the anode electrode mold 2102. This allows for the production of complex shapes, such as semi-curved sapphire transparent armor for use in vehicles, aircraft, as well as personnel armor (e.g., a breastplate contoured to the shape of a human torso or a transparent armor facemask). Once again utilizing a robot 2010 for manipulating the plasma torch 100 in combination with the welding positioner 2004 allows for the production of intricately shaped ceramic or sapphire products, such as transparent sapphire armor. Once again the RF coil 2008 allows for preheating and post-weld treating the ceramic or sapphire pieces 2104. Furthermore, a ceramic or sapphire rod 2106 may be used for adding filler material. In addition, crushed ceramic or sapphire boule 2108 may be used as a filler material.

Figure 22:
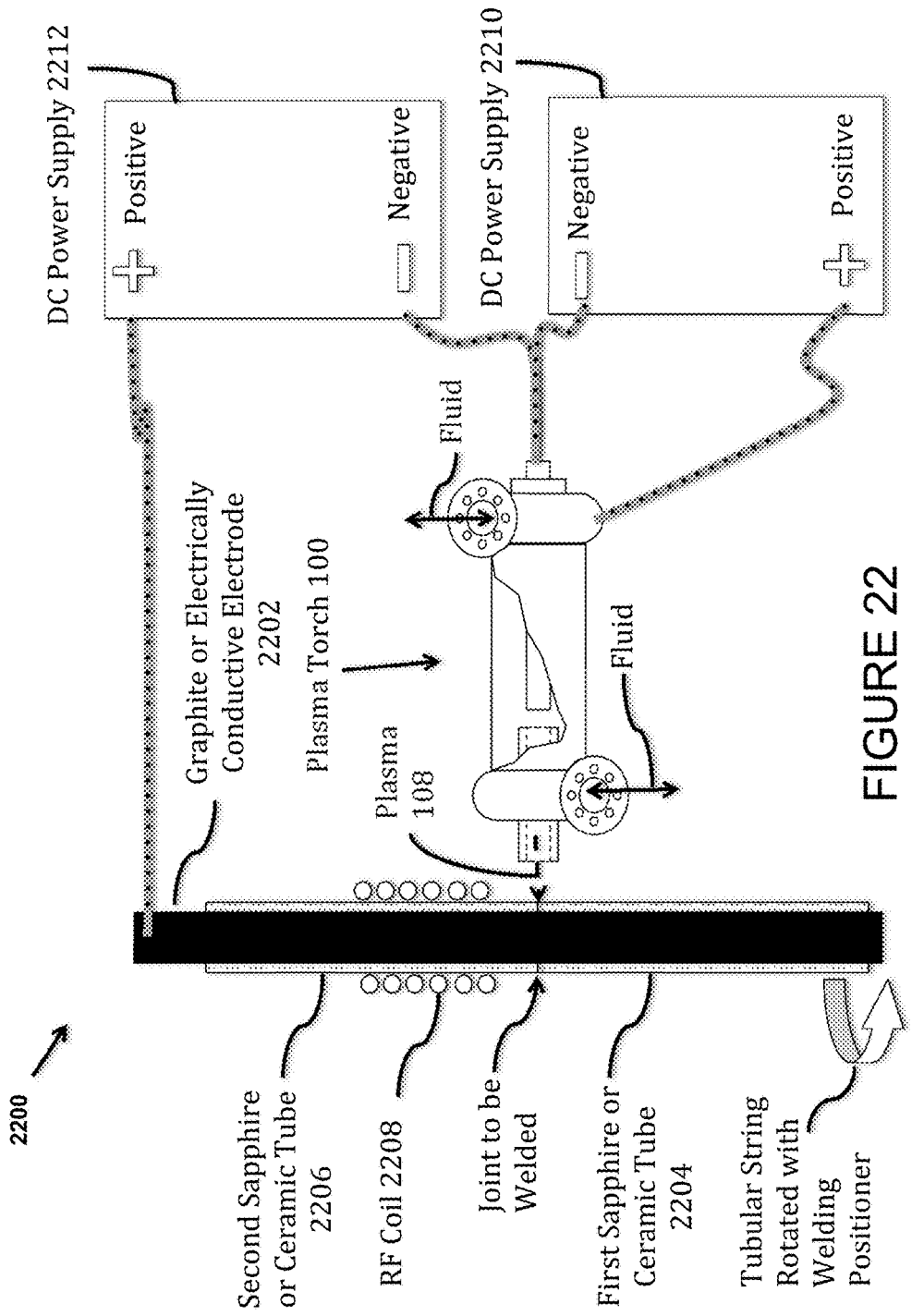
FIG. 22 is a diagram of an inductively coupled plasma arc welder in accordance with one embodiment of the present invention.

Referring now to FIG. 22, a diagram is shown of an inductively coupled plasma arc welder 2200 for welding ceramic or sapphire tubes utilizing a novel plasma arc welding method synergistically coupled with an induction preheating and post weld treating method. A graphite or electrically conductive electrode 2202 with an external diameter sized to slip into the first and second ceramic or sapphire tubes 2204 and 2206 is utilized as an electrode and is coupled to a welding positioner (not shown). Sapphire or ceramic tubes 2204 and 2206 are fed from the top and are stacked one upon another. The sapphire or ceramic tubes are preheated with the RF coil 2208 and are then plasma arc welded by transferring the arc 108 from the plasma torch 100 to the graphite electrode 2202 utilizing dual power supplies 2210 and 2212. Although two power supplies are not required, using dual power supplies allows for a faster welding speed and allows for centering the arc. An unexpected result occurred when operating in this mode. The plasma torch 100 operating in a non-transferred mode pierced a ceramic lined vessel by first melting the ceramic, then arcing over to the metal shell which was grounded to a second power supply. Likewise, the plasma torch 100 operates in a very stable mode when the arc is transferred to a second electrode. Hence, the disclosed device is ideal for manufacturing long sapphire or ceramic tubes by a synergistic inductively coupled plasma ArcWhirl® torch utilizing dual DC power supplies in addition to an induction power supply. However, this configuration is typically limited to the diameter and length of commonly available ceramic or sapphire tubes.

Figure 23:
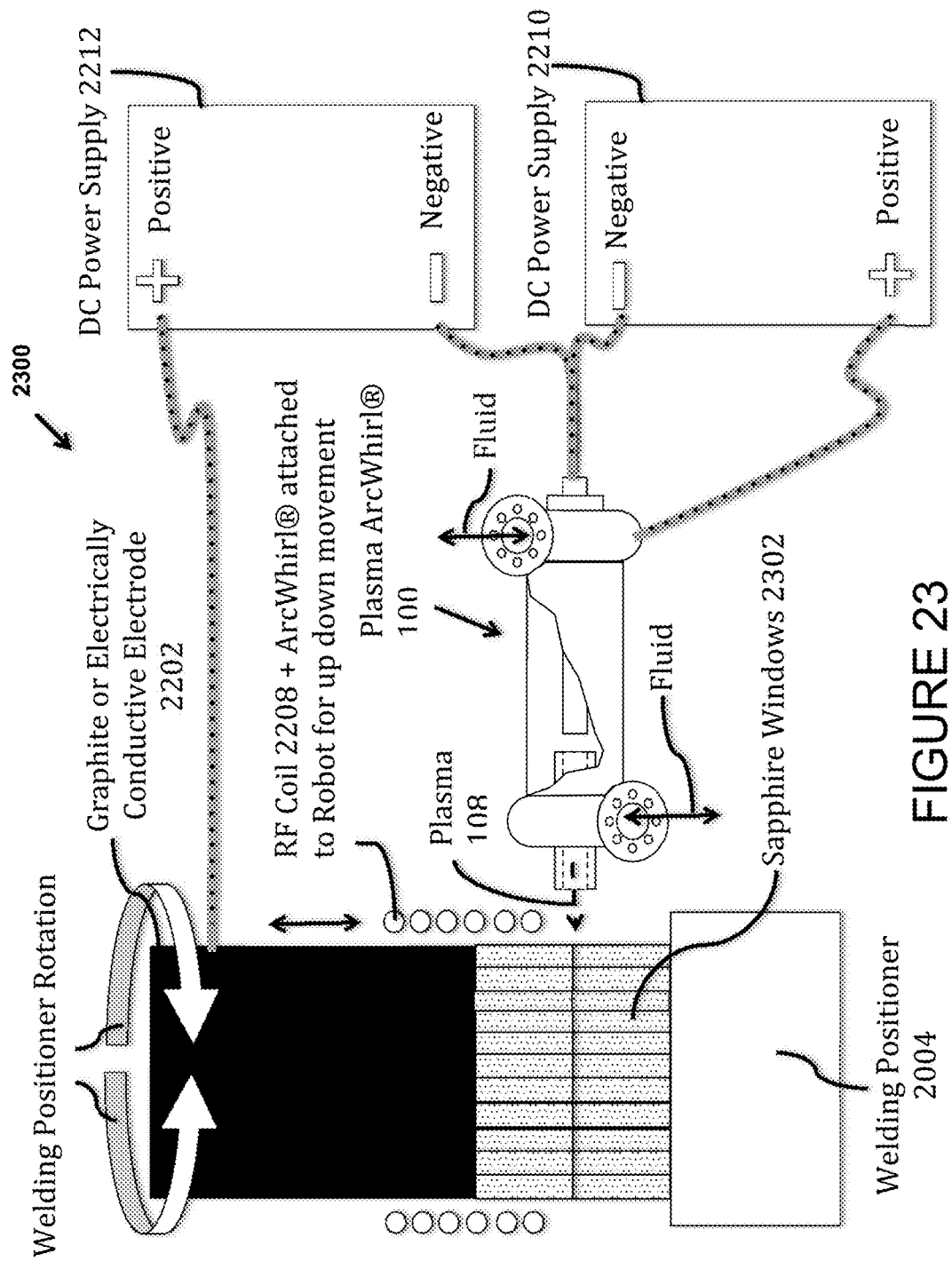
FIG. 23 is a diagram of an inductively coupled plasma arc welder in accordance with one embodiment of the present invention.

Referring now to FIG. 23, a diagram is shown of an inductively coupled plasma arc welder 2300 for welding ceramic or sapphire pieces to manufacture large ceramic or sapphire tubes utilizing a novel plasma arc welding method synergistically coupled with an induction preheating and post weld treating method. Sapphire windows are placed on a large electrode 2202 attached to a welding positioner 2004.

The sapphire windows 2302 may be held in place with a means commonly used for holding floor tile blocks together—utilizing a backing material. However, any means for holding the sapphire windows 2302 in place will suffice for carrying out the present invention. Once again as disclosed in FIG. 22 the electrode 2202 is rotated with the welding positioner 2004 to weld the top and bottom sapphire pieces together to form a ring. Next, the RF coil 2208 and torch 100 would be raised to weld a longitudinal seam and then the electrode 2202 would be indexed to weld the next seam by lowering the torch 100. Although not shown a second RF coil can be located below the plasma torch 100 to post treat the bottom sapphire pieces 2302. As previously disclosed the graphite electrode 2202 is inductively heated thus transferring heat to the sapphire 2302 via conduction and radiation. By closely heating the sapphire 2302 to near its melting point, the sapphire windows 2032 can be flash welded, thus allowing for rapid production via automation using a CNC welding positioner and robot.

Figure 24:
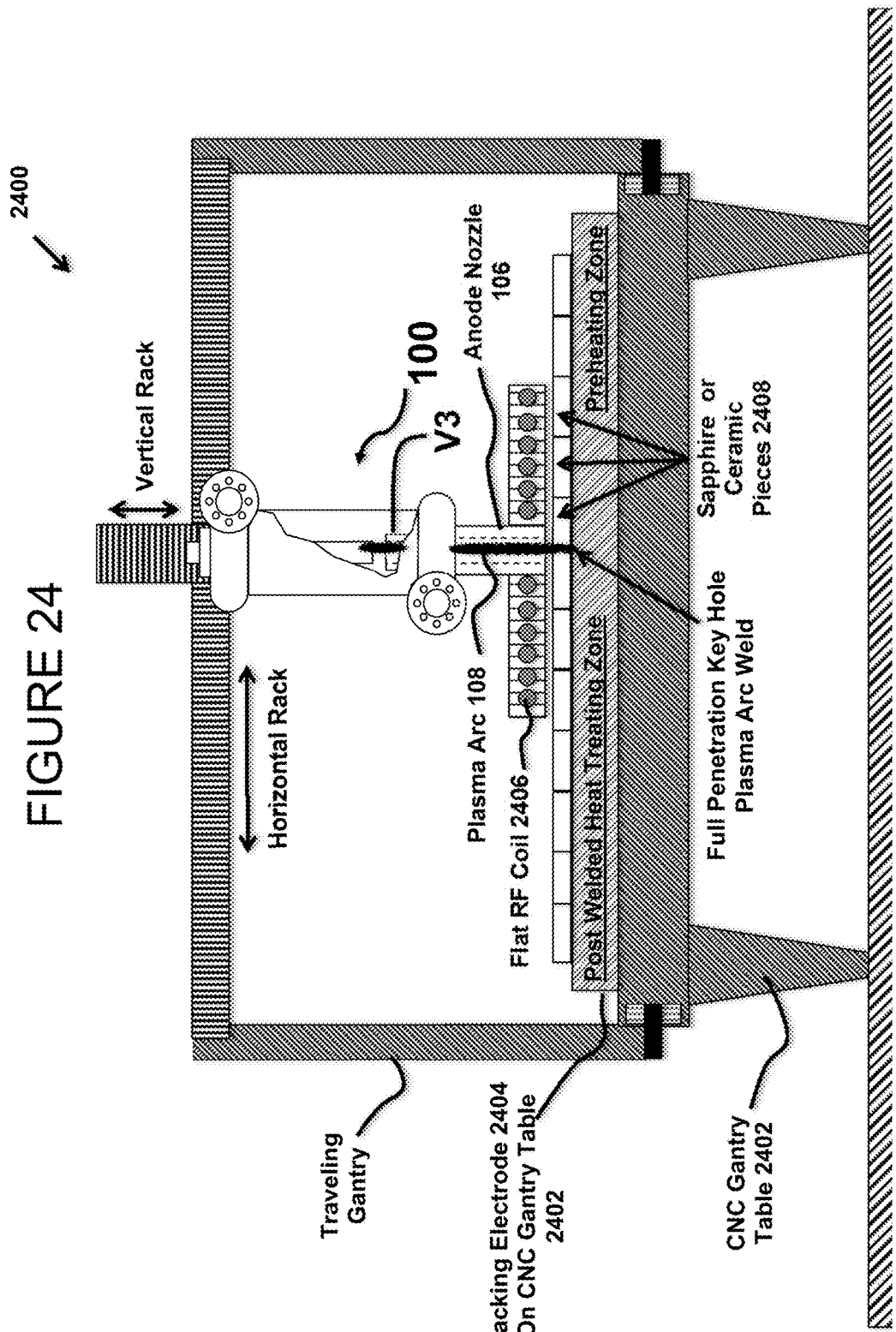
FIG. 24 is a diagram of an inductively coupled plasma arc welder in accordance with one embodiment of the present invention.

Turning back to FIGS. 9A and 9B while referring to FIG. 24, a diagram is shown of a gantry mounted inductively coupled plasma arc welder 2400 for welding ceramic or sapphire pieces to manufacture large ceramic or sapphire products, such as transparent armor, utilizing a novel plasma arc welding method synergistically coupled with an induction preheating and post weld treating method. Gantry mounted plasma cutting tables are well known and well understood. By placing a large graphite or high temperature electrical conductive backing material 2404, such as tungsten, molybdenum or silicon carbide, on a CNC gantry table 2402 this allows once again for transferring the arc to the backing electrode 2404 for full penetration keyhole welding. Likewise, the backing electrode 2404 may be machined into complex shapes thus allowing for the production of large transparent sapphire armor shapes for example but not limited to windows, transparent armor gun turrets, face shields and body shields. Once again the induction coil 2406 may be housed in alumina or any RF transparent material to reflect the infrared ("IR") produced from heating the backing electrode 2404. This novel configuration allows for preheating the sapphire or ceramic pieces 2408 prior to welding and post heat-treating the weld. What is not obvious is that by utilizing a backing electrode material 2404 that has a higher melting point than the sapphire or ceramic 2408, the sapphire or ceramic 2408 can be taken to a softening point, thus allowing for producing very intricate shapes based upon the backing electrode material's shape. For example, this configuration would allow for manufacturing a corrugated sapphire transparent armor shape. Thus, this would dramatically increase the strength of the window while still allowing for visibility.

Referring now to FIG. 25, a diagram is shown of a glow discharge plasma arc welder 2500 for welding ceramic utilizing a novel plasma arc welding method. The Glow Discharge ArcWhirl® Torch 800 shown in FIG. 25 allows for use of any fluid as the plasma gas, thus reducing production costs. Likewise, for welding sapphire and maintaining an oxidizing environment and ideal fluid is hydrogen peroxide. When hydrogen peroxide is heated it rapidly dissociates into water and oxygen. Consequently, this allows for producing an oxygen plasma without having to store or purchase bottled oxygen. Likewise, utilizing sodium carbonate will produce a steam, $CO_2$ and hydrogen plasma. In addition, if the sapphire or any ceramic must be etched, then any oxidizer in the form of a liquid salt may be used for example but not limited to sodium chloride and sodium fluoride. The salt solution will produce an acid gas, for example hydrogen fluoride which will etch sapphire.

Based on the foregoing description, the present invention provides a method for plasma arc welding at least two ceramic or sapphire pieces together. A plasma torch is provided that includes a cylindrical vessel having a first end and a second end, a tangential inlet connected to or proximate to the first end, a tangential outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that the center line of the hollow electrode nozzle is aligned with the longitudinal axis of the cylindrical vessel. A second electrode is positioned proximate to the hollow electrode nozzle. The two ceramic or sapphire pieces are placed between the second electrode and the hollow electrode. The two ceramic or sapphire pieces are welded together with the plasma exiting from the hollow electrode by means of transferring the arc from the electrode through the hollow electrode and to the second electrode.

In addition, the method may include providing one or more radio frequency coils proximate to the two ceramic or sapphire pieces or the second electrode or the hollow electrode or a combination thereof, and preheating or post heating or both the two ceramic or sapphire pieces using the one or more radio frequency coils. Moreover, the method may include: (1) providing a multi-axis welding positioner attached to the second electrode and adjusting a position of the second electrode using the multi-axis welding positioner; (2) providing a multi-axis robot operably attached to the cylindrical vessel and adjusting a position of the cylindrical vessel using the multi-axis robot; or (3) both. Furthermore, the method may include: (1) providing a ceramic or sapphire rod and feeding the ceramic or sapphire rod into the plasma exiting the electrode nozzle; (2) providing a crushed ceramic or sapphire boule and depositing the crushed ceramic or sapphire boule between the two ceramic or sapphire pieces.

The foregoing description of the apparatus and methods of the invention in preferred and alternative embodiments and variations, and the foregoing examples of processes for which the invention may be beneficially used, are intended to be illustrative and not for purpose of limitation. The invention is susceptible to still further variations and alternative embodiments within the full scope of the invention, recited in the following claims.

What is claimed is:

1. A method for plasma arc welding two ceramic or sapphire pieces together comprising:
   providing a plasma torch comprising:
      a cylindrical vessel having a first end and a second end,
      a tangential inlet connected to or proximate to the first end,
      a tangential outlet connected to or proximate to the second end,
      an electrode housing connected to the first end of the cylindrical vessel such that a first electrode is (a) aligned with a longitudinal axis of the cylindrical vessel, and (b) extends into the cylindrical vessel, and
      a hollow electrode nozzle connected to the second end of the cylindrical vessel such that the center line of the hollow electrode nozzle is aligned with the longitudinal axis of the cylindrical vessel;

providing a second electrode positioned proximate to the hollow electrode nozzle;

placing the two ceramic or sapphire pieces between the second electrode and the hollow electrode; and welding the two ceramic or sapphire pieces together with the plasma exiting from the hollow electrode by means of transferring the arc from the electrode through the hollow electrode and to the second electrode.

2. The method as recited in claim 1, further comprising:
providing one or more radio frequency coils proximate to the two ceramic or sapphire pieces or the second electrode or the hollow electrode or a combination thereof; and
preheating or post heating or both the two ceramic or sapphire pieces using the one or more radio frequency coils.

3. The method as recited in claim 1, further comprising:
providing a multi-axis welding positioner attached to the second electrode; and
adjusting a position of the second electrode using the multi-axis welding positioner.

4. The method as recited in claim 1, further comprising:
providing a multi-axis robot operably attached to the cylindrical vessel; and
adjusting a position of the cylindrical vessel using the multi-axis robot.

5. The method as recited in claim 1, further comprising:
providing a ceramic or sapphire rod; and
feeding the ceramic or sapphire rod into the plasma exiting the electrode nozzle.

6. The method as recited in claim 1, further comprising:
providing a crushed ceramic or sapphire boule; and
depositing the crushed ceramic or sapphire boule between the two ceramic or sapphire pieces.

7. A device for plasma arc welding two ceramic or sapphire pieces together comprising:
a cylindrical vessel having a first end and a second end;
a tangential inlet connected to or proximate to the first end;
a tangential outlet connected to or proximate to the second end;
an electrode housing connected to the first end of the cylindrical vessel such that a first electrode is (a) aligned with a longitudinal axis of the cylindrical vessel, and (b) extends into the cylindrical vessel;
a hollow electrode nozzle connected to the second end of the cylindrical vessel such that the center line of the hollow electrode nozzle is aligned with the longitudinal axis of the cylindrical vessel;
a second electrode positioned proximate to the hollow electrode nozzle such that the ceramic or sapphire is positioned between the second electrode and the hollow electrode; and
wherein (a) the tangential inlet and the tangential outlet create a vortex within the cylindrical vessel, and (b) the first electrode and the hollow electrode nozzle create a plasma that discharges through the hollow electrode nozzle and couples to the second electrode such that the two pieces of ceramic or sapphire are welded together.

8. The device as recited in claim 7, wherein the second electrode is substantially aligned with the longitudinal axis of the cylindrical vessel.

9. The device as recited in claim 7, wherein the second electrode is attached to a multi-axis welding positioner.

10. The device as recited in claim 9, further comprising a table disposed between the second electrode and the multi-axis welding positioner.

11. The device as recited in claim 9, further comprising a radio frequency coil disposed around the second electrode.

12. The device as recited in claim 9, wherein the second electrode is shaped to the weld the two pieces of ceramic or sapphire into a specified shape.

13. The device as recited in claim 7, further comprising a multi-axis robot operably attached to the cylindrical vessel.

14. The device as recited in claim 7, wherein:
the two pieces of ceramic or sapphire comprise ceramic or sapphire tubes; and
the second electrode is cylindrically shaped and sized to fit within the ceramic or sapphire tubes.

15. The device as recited in claim 14, further comprising two or more power supplies electrically connected to the first electrode, the hollow electrode nozzle and the second electrode.

16. The device as recited in claim 14, further comprising one or more radio frequency coils disposed around the ceramic or sapphire tubes.

17. The device as recited in claim 16, wherein the one or more radio frequency coils preheat or post heat or both the ceramic or sapphire tubes.

18. The device as recited in claim 7, further comprising:
a CNC gantry table;
a traveling gantry moveably connected to the CNC gantry table;
the cylindrical vessel moveably connected to the traveling gantry; and
the second electrode comprises a backing electrode disposed on the CNC gantry table.

19. The device as recited in claim 18, further comprising a flat radio frequency coil disposed above the backing electrode.

20. The device as recited in claim 19, wherein the flat radio frequency coil preheats or post heats or both the ceramic or sapphire tubes.

21. The device as recited in claim 7, further comprising:
an electromagnetic radiation source that produces a wave energy and is disposed around or within the cylindrical vessel;
at least a portion of the cylindrical vessel is transparent or semi-transparent to a wave energy; and
the wave energy from the electromagnetic radiation source couples to the first electrode, the hollow electrode nozzle, the plasma or a combination thereof.

22. The device as recited in claim 7, wherein:
the cylindrical vessel comprises an electrically conductive cylindrical vessel;
a first insulator that seals the first end of the electrically conductive cylindrical vessel around the hollow electrode and maintains a substantially equidistant gap between the electrically conductive cylindrical vessel and the hollow electrode;
a non-conductive granular material disposed within the substantially equidistant gap, wherein the non-conductive granular material allows an electrically conductive fluid to flow between the electrically conductive cylindrical vessel and the hollow electrode, and the combination of the non-conductive granular material and the electrically conductive fluid prevents electrical arcing between the cylindrical vessel and the hollow electrode during an electric glow discharge; and
a concentric reducer disposed within the electrically conductive cylindrical vessel and extending from the second end of the electrically conductive cylindrical vessel to the hollow electrode.

* * * * *